United States Patent
Kraus et al.

(10) Patent No.: US 12,336,536 B2
(45) Date of Patent: *Jun. 24, 2025

(54) METHOD FOR CONTROLLING HERBICIDE RESISTANT OR TOLERANT WEEDS

(71) Applicant: BASF Agro B.V., Arnhem (NL)

(72) Inventors: Helmut Kraus, Research Triangle Park, NC (US); Bernd Sievernich, Hassloch (DE); Mariano Etcheverry, Kiev (UA); Richard R. Evans, Raleigh, NC (US); Ryan Louis Nielson, Schriesheim (DE); Andreas Landes, Roemerberg (DE); Cyrill Zagar, Raleigh, NC (US); Rex A. Liebl, Raleigh, NC (US)

(73) Assignee: BASF AGRO B.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/741,454

(22) PCT Filed: Jul. 6, 2016

(86) PCT No.: PCT/EP2016/066012
§ 371 (c)(1),
(2) Date: Jan. 2, 2018

(87) PCT Pub. No.: WO2017/009148
PCT Pub. Date: Jan. 19, 2017

(65) Prior Publication Data
US 2018/0368411 A1  Dec. 27, 2018

Related U.S. Application Data

(60) Provisional application No. 62/190,788, filed on Jul. 10, 2015.

(30) Foreign Application Priority Data

Oct. 28, 2015 (EP) ..................................... 15191791

(51) Int. Cl.
| | | |
|---|---|---|
| A01N 43/90 | (2006.01) | |
| A01N 25/00 | (2006.01) | |
| A01N 37/22 | (2006.01) | |
| A01N 39/02 | (2006.01) | |
| A01N 41/10 | (2006.01) | |
| A01N 43/20 | (2006.01) | |
| A01N 43/54 | (2006.01) | |
| A01N 43/56 | (2006.01) | |
| A01N 43/60 | (2006.01) | |
| A01N 43/80 | (2006.01) | |
| A01N 43/86 | (2006.01) | |
| A01N 47/36 | (2006.01) | |
| A01N 47/38 | (2006.01) | |

(52) U.S. Cl.
CPC .............. *A01N 43/90* (2013.01); *A01N 37/22* (2013.01); *A01N 39/02* (2013.01); *A01N 41/10* (2013.01); *A01N 43/20* (2013.01); *A01N 43/54* (2013.01); *A01N 43/56* (2013.01); *A01N 43/60* (2013.01); *A01N 43/80* (2013.01); *A01N 43/86* (2013.01); *A01N 47/36* (2013.01); *A01N 47/38* (2013.01); *A01N 2300/00* (2013.01)

(58) Field of Classification Search
CPC ................................ A01N 43/90; A01N 37/50
See application file for complete search history.

(56) References Cited

U.S. PATENT DOCUMENTS

| | | |
|---|---|---|
| 4,487,945 A | 12/1984 | Payne |
| 4,670,041 A | 6/1987 | Payne et al. |
| 5,334,576 A | 8/1994 | Doehner et al. |
| 5,750,130 A | 5/1998 | Ferrell et al. |
| 5,877,115 A | 3/1999 | Fenderson et al. |
| 5,928,996 A | 7/1999 | Fenderson et al. |
| 5,972,154 A | 10/1999 | Konya |
| 5,981,432 A | 11/1999 | Hudetz et al. |
| 6,013,605 A | 1/2000 | Rees et al. |
| 6,090,750 A | 7/2000 | Chollet et al. |
| 6,339,158 B1 | 1/2002 | Wepplo et al. |
| 6,534,444 B1 | 3/2003 | Sievernich et al. |
| 7,344,730 B1 | 3/2008 | Stadler et al. |
| 7,375,058 B2 | 5/2008 | Zagar et al. |
| 7,635,404 B1 | 12/2009 | Devic et al. |
| 7,737,275 B2 | 6/2010 | Hamprecht et al. |

(Continued)

FOREIGN PATENT DOCUMENTS

| | | |
|---|---|---|
| CN | 1368846 A | 9/2002 |
| CN | 102396466 A | 4/2012 |

(Continued)

OTHER PUBLICATIONS

CABA abstract 1978:121110 (1978).*

(Continued)

*Primary Examiner* — John Pak
(74) *Attorney, Agent, or Firm* — MARSHALL, GERSTEIN & BORUN LLP

(57) ABSTRACT

The present invention relates to methods and uses for controlling herbicide resistant or tolerant weed species by applying the herbicidal compound (±)-2-exo-(2-Methylbenzyloxy)-1-methyl-4-isopropyl-7-oxabicyclo[2.2.1]heptane, any of its individual enantiomers or any non-racemic mixture thereof. The methods and uses are particularly suitable for the protection of crops. The invention also relates to specific herbicidal compositions comprising said herbicidal compound.

11 Claims, No Drawings

(56) References Cited

U.S. PATENT DOCUMENTS

| | | | |
|---|---|---|---|
| 7,846,872 | B2 | 12/2010 | Zagar et al. |
| 7,847,097 | B2 | 12/2010 | Gebhardt et al. |
| 8,362,026 | B2 | 1/2013 | Schmidt et al. |
| 9,375,002 | B2 | 6/2016 | Minn et al. |
| 12,173,301 | B2 * | 12/2024 | Dale ............... C12N 9/16 |
| 2004/0266623 | A1 | 12/2004 | Armbruster et al. |
| 2005/0159622 | A1 | 7/2005 | Hamprecht et al. |
| 2005/0250646 | A1 | 11/2005 | Kawasaki et al. |
| 2006/0293520 | A1 | 12/2006 | Hamprecht et al. |
| 2008/0081211 | A1 | 4/2008 | Tuffe et al. |
| 2008/0153704 | A1 | 6/2008 | Yamaji et al. |
| 2008/0234131 | A1 * | 9/2008 | Gewehr ............... A01N 43/90 504/140 |
| 2008/0293941 | A1 | 11/2008 | Gebhardt et al. |
| 2008/0305954 | A1 | 12/2008 | Zawierucha et al. |
| 2009/0247408 | A1 | 10/2009 | Koschnick et al. |
| 2009/0306142 | A1 | 12/2009 | Carson et al. |
| 2010/0105562 | A1 | 4/2010 | Schmidt et al. |
| 2010/0311588 | A1 | 12/2010 | Gatzweiler et al. |
| 2010/0323893 | A1 | 12/2010 | Ikeda |
| 2011/0059849 | A1 | 3/2011 | Refardt et al. |
| 2011/0065579 | A1 | 3/2011 | Sievernich et al. |
| 2011/0098182 | A1 | 4/2011 | Mann et al. |
| 2011/0212837 | A1 | 9/2011 | Angermann et al. |
| 2011/0224077 | A1 | 9/2011 | Hacker et al. |
| 2011/0245079 | A1 | 10/2011 | James et al. |
| 2012/0108429 | A1 | 5/2012 | Anderson et al. |
| 2012/0117676 | A1 | 5/2012 | Carlson et al. |
| 2012/0263775 | A1 | 10/2012 | Blei et al. |
| 2013/0143742 | A1 | 6/2013 | Ikeda |
| 2013/0237417 | A1 | 9/2013 | Ikeda |
| 2013/0274106 | A1 | 10/2013 | Ikeda |
| 2014/0031220 | A1 | 1/2014 | Yerkes et al. |
| 2014/0031228 | A1 * | 1/2014 | Mann ............... A01N 43/40 504/130 |
| 2014/0243200 | A1 | 8/2014 | Mann et al. |
| 2014/0309116 | A1 * | 10/2014 | Kraus ............... C07D 417/12 504/247 |
| 2014/0329681 | A1 | 11/2014 | Ikeda |
| 2016/0000074 | A1 * | 1/2016 | Young ............... A01N 43/36 504/103 |

FOREIGN PATENT DOCUMENTS

| | | |
|---|---|---|
| CN | 103250698 A | 8/2013 |
| CN | 103283779 A | 9/2013 |
| CN | 103314958 A | 9/2013 |
| CN | 102461547 B | 11/2013 |
| CN | 103766372 A | 5/2014 |
| CN | 104012548 A | 9/2014 |
| CN | 104082324 A | 10/2014 |
| CN | 104186502 A | 12/2014 |
| DE | 19544393 A1 | 5/1997 |
| DE | 19900571 A1 | 7/1999 |
| EP | 0 081 893 | 6/1983 |
| EP | 0326305 A2 | 8/1989 |
| EP | 0449751 A1 | 10/1991 |
| EP | 0585895 B1 | 11/1995 |
| EP | 0398692 B1 | 8/1996 |
| EP | 1417885 B1 | 10/2007 |
| EP | 2081893 B1 | 3/2011 |
| EP | 2710894 A1 | 3/2014 |
| EP | 3081893 B1 | 12/2018 |
| EP | 2777397 B1 | 1/2019 |
| FR | 3002413 A1 | 8/2014 |
| GB | 2011416 A1 | 7/1979 |
| JP | 58013504 A2 | 1/1983 |
| JP | S58-110591 A | 7/1983 |
| JP | S63-165301 A | 7/1988 |
| JP | H-06-145006 | 5/1994 |
| JP | H07304610 A | 11/1995 |
| JP | H09-104604 A | 4/1997 |
| JP | 2006-131602 | 5/2006 |
| JP | 2006-131602 A | 5/2006 |
| JP | 2015-502943 A | 1/2015 |
| JP | 2015-516383 A | 6/2015 |
| WO | WO-88/02598 | 4/1988 |
| WO | 9603229 A1 | 2/1996 |
| WO | 9821174 A1 | 5/1998 |
| WO | 9946246 A1 | 9/1999 |
| WO | 9965314 A1 | 12/1999 |
| WO | 200008936 A1 | 2/2000 |
| WO | 2001083459 A2 | 11/2001 |
| WO | 2003024221 A1 | 3/2003 |
| WO | 2003097587 A2 | 11/2003 |
| WO | 2003097589 A1 | 11/2003 |
| WO | 2005054208 A1 | 6/2005 |
| WO | 2006005490 A2 | 1/2006 |
| WO | 2006063834 A2 | 6/2006 |
| WO | 2006097589 A2 | 9/2006 |
| WO | 2006125746 A1 | 11/2006 |
| WO | WO-2007/023099 | 3/2007 |
| WO | WO-2007/030886 | 3/2007 |
| WO | WO-2007/030886 A1 | 3/2007 |
| WO | 2007048735 A2 | 5/2007 |
| WO | 2007071655 A2 | 6/2007 |
| WO | 2007133522 A2 | 11/2007 |
| WO | 2008043835 A2 | 4/2008 |
| WO | WO-2008/050233 A1 | 5/2008 |
| WO | WO-2008/075065 A2 | 6/2008 |
| WO | 2009010475 A2 | 1/2009 |
| WO | 2009103760 A2 | 8/2009 |
| WO | 2009115434 A2 | 9/2009 |
| WO | 2009115490 A2 | 9/2009 |
| WO | 2009127635 A1 | 10/2009 |
| WO | 2009141367 A2 | 11/2009 |
| WO | 2009153246 A2 | 12/2009 |
| WO | 2010046268 A2 | 4/2010 |
| WO | 2010089208 A1 | 8/2010 |
| WO | 2010136146 A2 | 12/2010 |
| WO | 2011023759 A2 | 3/2011 |
| WO | 2011104213 A2 | 9/2011 |
| WO | 2012057743 A1 | 5/2012 |
| WO | 2012102703 A1 | 8/2012 |
| WO | 2013026811 A1 | 2/2013 |
| WO | 2013040163 A1 | 3/2013 |
| WO | 2013089207 A1 | 6/2013 |
| WO | 2013089208 A1 | 6/2013 |
| WO | WO-2013/080484 A1 | 6/2013 |
| WO | 2013134310 A1 | 9/2013 |
| WO | 2014018395 A1 | 1/2014 |
| WO | WO-2014/018402 A1 | 1/2014 |
| WO | WO-2014/018410 A1 | 1/2014 |
| WO | 2014077343 A1 | 5/2014 |
| WO | 2014131958 A1 | 9/2014 |
| WO | 2014149557 A1 | 9/2014 |
| WO | 2015007564 A1 | 1/2015 |
| WO | 2015022634 A2 | 2/2015 |
| WO | 2015022635 A1 | 2/2015 |
| WO | 2015026923 A2 | 2/2015 |
| WO | 2015041642 A1 | 3/2015 |
| WO | 2015044150 A2 | 4/2015 |
| WO | 2015052152 A1 | 4/2015 |
| WO | 2015052153 A1 | 4/2015 |
| WO | 2015052173 A1 | 4/2015 |
| WO | 2015052178 A1 | 4/2015 |
| WO | 2015091642 A1 | 6/2015 |
| WO | 2015104242 A1 | 7/2015 |
| WO | 2015104243 A1 | 7/2015 |
| WO | 2015134573 A1 | 9/2015 |
| WO | 2015151088 A1 | 10/2015 |
| WO | 2015155236 A1 | 10/2015 |
| WO | 2015158565 A1 | 10/2015 |
| WO | 2015197392 A1 | 12/2015 |
| WO | 2016062814 A1 | 4/2016 |
| WO | 2016113334 A1 | 7/2016 |
| WO | 2016116531 A1 | 7/2016 |
| WO | 2016120116 A1 | 8/2016 |
| WO | 2016120355 A2 | 8/2016 |
| WO | 2016169795 A1 | 10/2016 |
| WO | 2016180614 A1 | 11/2016 |
| WO | 2016180642 A1 | 11/2016 |
| WO | 2017009054 A1 | 1/2017 |

(56) References Cited

FOREIGN PATENT DOCUMENTS

| | | |
|---|---|---|
| WO | 2017009056 A1 | 1/2017 |
| WO | 2017009060 A1 | 1/2017 |
| WO | 2017009061 A1 | 1/2017 |
| WO | 2017009088 A1 | 1/2017 |
| WO | 2017009089 A1 | 1/2017 |
| WO | 2017009090 A1 | 1/2017 |
| WO | 2017009092 A1 | 1/2017 |
| WO | 2017009095 A1 | 1/2017 |
| WO | 2017009124 A1 | 1/2017 |
| WO | 2017009134 A1 | 1/2017 |
| WO | 2017009137 A1 | 1/2017 |
| WO | 2017009138 A1 | 1/2017 |
| WO | 2017009139 A1 | 1/2017 |
| WO | 2017009140 A1 | 1/2017 |
| WO | 2017009142 A1 | 1/2017 |
| WO | 2017009143 A1 | 1/2017 |
| WO | 2017009144 A1 | 1/2017 |
| WO | 2017009145 A1 | 1/2017 |
| WO | 2017009146 A1 | 1/2017 |
| WO | 2017009147 A1 | 1/2017 |
| WO | 2017009148 A1 | 1/2017 |
| WO | 2017021430 A1 | 2/2017 |

OTHER PUBLICATIONS

HCAPLUS abstract 1988:217714 (1988).*
Heap, I., "Global perspective of herbicide-resistant weeds," Pest Management Science, vol. 70, pp. 1306-1315 (2014).*
Bailly, G.C. et al., "Role of residual herbicides for the management of multiple herbicide resistance to ACCase and ALS inhibitors in a black-grass population," Crop Protection, vol. 34, 96-103 (2012).*
Cross, R.B. et al., "Detecting annual blugrass (Poa annua) resistance to ALS-inhibiting herbicides using a rapid diagnostic assay," Weed Science, vol. 61, pp. 384-389 (2013).*
Grossmann, K. et al., "On the mode of action of the herbicide cinmethylin and 5-benzyloxymethyl-1,2-isoxazolines: putative inhibitors of plant tyrosine aminotransferase," Pest Management Science, vol. 68, pp. 482-492 (2012).*
Grossmann, K. et al., "Physionomics and metabolomics—two key approaches in herbicidal mode of action discovery," Pest Management Science, vol. 68, pp. 494-504 (2012).*
Moncorge, J.M., "The use of WL95481 in transplanted paddy rice," 1987 British Crop Protection Conference—Weeds, pp. 197-204 (1987).*
Office Action issued in co-pending U.S. Appl. No. 15/741,458, dated Mar. 5, 2019.
Tanetani et al., "Action Mechanism of a Novel Herbicide, Pyroxasulfone," Pesticide Biochemistry and Physiology, vol. 95. pp. 47-55 (2009).
Farm Chemicals Handbook '98, Meister Publishing Co., Willoughby, OH, p. C9 (1998).
Office Action issued in co-pending U.S. Appl. No. 15/741,588 dated Mar. 4, 2019.
Office Action, issued in co-pending U.S. Appl. No. 15/024,462, dated Mar. 29, 2018.
Final Office Action, issued in co-pending U.S. Appl. No. 15/024,462, dated Nov. 27, 2018.
Office Action, issued in co-pending U.S. Appl. No. 15/544,574, dated Aug. 30, 2018.
Office Action, issued in co-pending U.S. Appl. No. 15/741,588, dated Aug. 7, 2018.
Office Action, issued in co-pending U.S. Appl. No. 15/740,401, dated Sep. 27, 2018.
Keifer et al., US Statutory Invention Registration No. H806, Herbicidal Clomazone Compositions and Methods of Use Tolerant to Corn and Other Crops, (Aug. 7, 1990).
Office Action, issued in co-pending U.S. Appl. No. 15/739,847, dated Jun. 26, 2018.
Office Action, issued in co-pending U.S. Appl. No. 15/739,847, dated Dec. 26, 2018.
Office Action, issued in co-pending U.S. Appl. No. 15/741,586, dated Oct. 1, 2018.
"The Pesticide Manual", ed. C.D.S Tomlin, British Crop Production Council, Fourteenth Edition, 2006, Entry 647, p. 815.
International Search Report for PCT/EP2016/066012 dated Sep. 21, 2016.
European Search Report for EP Application No. 15191791.1 dated Feb. 24, 2016.
"The Pesticide Manual," Fourteenth Edition, ed., C.D.S. Tomlin, British Crop Production Council, 2006, Entry 157, pp. 195-196.
European Search Report for EP Patent Application No. 21192181.2, Issued on Dec. 21, 2021, 7 pages.
European Search Report for EP Patent Application No. 21192190.3, Issued on Jan. 18, 2022, 6 pages.
European Search Report for EP Patent Application No. 21192195.2, Issued on Jan. 21, 2022, 7 pages.
Kemp, et al., "Chapter 26: Herbicide Resistance in Alopecurus myosuroides", Managing Resistance to Agrochemicals, ed. Green, et al., vol. 421, Feb. 23, 1990, pp. 376-393.
Kilin, "Aclonifen: The identikit of a widely used herbicide", African Journal of Agricultural Research, vol. 6, Issue 10, May 31, 2011, pp. 2411-2419.
The Pesticide Manual, ed. C.D.S. Tomlin, British Crop Production Council, Fourteenth Edition, (2006), entry 388, pp. 492-493.
The Pesticide Manual, ed. C.D.S. Tomlin, British Crop Production Council, Fourteenth Edition, (2006), entry 769, pp. 972-973.
The Pesticide Manual, ed. C.D.S. Tomlin, British Crop Production Council, Fourteenth Edition, (2006), entry 567 pp. 1716-1717.
The Pesticide Manual, ed. C.D.S. Tomlin, British Crop Production Council, Fourteenth Edition, (2006), entry 568 pp. 718-719.
Database WPI, Week 199604, Thomson Scientific, London, GB; AN 1996-035789, XP002752882, Synergistic Herbicidal Composition—Contains Metolachlor or Cinmethylin, and Flupoxam, (1995).
The e-Pesticide Manual, Fifteenth Edition, ed., C.D.S. Tomlin, British Crop Production Council, 2011, Entry 752, p. 1.
The Pesticide Manual, ed. C.D.S Tomlin, British Crop Production Council, Fourteenth Edition , 2006, entry 162, pp. 202-203.
The Pesticide Manual, ed. C.D.S Tomlin, British Crop Production Council, Fourteenth Edition, 2006, entry 404, p. 514.
The Pesticide Manual, ed. C.D.S Tomlin, British Crop Production Council, Fourteenth Edition , 2006 , entry 55, pp. 64-65.
The Pesticide Manual, Fourteenth Edition, ed. C.D.S. Tomlin, British Crop Production Council, 2006, Entry 464, pp. 587-589.
Material Safety Data Sheet Material Name Echelon 0.30% 12-0-4 25%SCU Fl, (2012), pp. 1-5, [on-line] retrieved from http://www.turfcaresupply.com/upload/documents/msds/SKU_901560_-_MSDS_US_-ECHELON_0.30_12-0-4_25SCU_FL.pdf, [retrieved on Mar. 6, 2015].
Sugarcane Weed Control, 2007 Louisiana Suggested Weed Control Guide, (2007), pp. 85-99, [on-line] retrieved from http://www.lsuagcenter.com/NR/rdonlyres/719A2391-DC91-459F-B188-B03A21429994/32856/Sugarcane.pdf, [retrieved on Jan. 16, 2014].
The Pesticide Manual, ed. C.D.S. Tomlin, British Crop Production Council, Fourteenth Edition, (2006), entry 732, pp. 928-929.
The Pesticide Manual, ed. C.D.S. Tomlin, British Crop Production Council, Fourteenth Edition, (2006), entry 733, pp. 929-930.
The Pesticide Manual, ed. C.D.S. Tomlin, British Crop Production Council, Fourteenth Edition, (2006), entry 268 pp. 341-343.
Anonymous, Aerosil and SIPERNAT Products for Optimized Crop Protection Formulations Industry Information, (2012), pp. 1-16, [on-line] retrieved from http://www.aerosil.com/product/aerosil/Documents/II-02241-AEROSIL-and-SIPERNAT-Products-for-Optimized-Crop-Protection-EN.pdf, [retrieved on Mar. 10, 2015].
Anonymous, DuPont Velpar DF Herbicide, [on-line] retrieved from http://www.cdms.net/ldat/ld0BP011.pdf, [retrieved on Mar. 6, 2015].
Anonymous, Material Safety Data Sheet Balance WDG Herbicide, (2008), pp. 1-9, [on-line] retrieved from http://www.agrian.com/pdfs/Balance_WDG_Herbicide_MSDS.pdf, [retrieved on Mar. 10, 2015].
Blouin et al., Analysis of Synergistic and Antagonistic Effects of Herbicides Using Nonlinear Mixed-Model Methodology 1, Weed Technology, 2004, vol. 18, No. 2, pp. 464-472.

(56) References Cited

OTHER PUBLICATIONS

Carbonari et al., Eficácia da Utilização e Grânulos de Argila Como Veículo para a Aplicação aérea de Sulfentrazone e Isoxaflutole em área de Implantação de Eucalipto, Planta Daninha, Viçosa-MG, vol. 28, No. 1, (2010), pp. 207-212, [on-line] retrieved from http://www.scielo.br/pdf/pd/v28n1/24.pdf, [retrieved on Mar. 6, 2015].

Cespedes et al., Bentonite and Anthracite in Alginate-Based Controlled Release Formulations to Reduce Leaching of Chloridazon and Metribuzin in a Calcareous Soil, Chemosphere, vol. 92, No. 8, (2013), pp. 918-924.

Corn and Soybean Herbicide Chart, University of Wisconsin-Extension, College of Agricultural and Life Sciences, Jan. 2013; obtained from the Internet on Aug. 8, 2018: https://ag.purdue.edu/btny/weedscience/Documents/Herbicide_MOA_CornSoy_12_2012[1].pdf.

Database Caplus, Chemical Abstracts Service, Columbus, OH, Database Accession No. 2013:382624. KP002737177 (2013).

Dickinson and Carpenter, Home-made Granular Formulations for Applying Chemicals to Irrigated Rice, International Journal of Pest Management, vol. 23, No. 2, (1977), pp. 234-235.

Grossmann et al., The herbicide saflufenacil (KixorTM) is a new inhibitor of protoporphyrinogen IX oxidase activity, Weed Science, vol. 58, pp. 1-9 (2010).

Ibrahim, Weed Management: Country Status Paper—Egypt, Improved Weed Management in the Near East: Proceedings of the FAO Expert Consultation on Improved Weed Management in the Near East, Nicosia, Cyprus, Oct. 30-Nov. 1, 1985, (1995), pp. 100-103.

Jhala et al., Tank Mixing Saflufenacil, Glufosinate, and Indaziflam Improved Burndown and Residual Weed Control, Weed Technology, 2013, vol. 27, No. 2, pp. 422-429.

Kadant Grantek's Biodac Active Ingredients & Formulations Compatible with Biodac, (2011), [on-line] retrieved from http://biodac.net/images/AI and Formulations w_Cover.pdf, [retrieved on May 7, 2014].

Li et al, Addition of Modified Bentonites in Polymer Gel Formulation of 2,4-D for Its Controlled Release in Water and Soil, Journal of Agricultural and Food Chemistry, vol. 57, No. 7, (2009), pp. 2868-2874.

Li et al., Controlled Release and Retarded Leaching of Pesticides by Encapsulating in Carboxymethyl Chitosan/Bentonite Composite Gel, Journal of Environmental Science and Health, Part B, vol. 47, No. 8, (2012), pp. 795-803.

Mojave Granular Weed Killer MSDS, (1996), p. 1, [on-line] retrieved from http://www.kellysolutions.com/erenewal s/documentsubmit/KellyData\OK\pesticide\MSDS\73718\34913-16-73718\34913-16-73718_Mojave_Granular_Weed_Killer_10_31_2006_12_11_38_PM.pdf, [retrieved on Mar. 6, 2015].

Orsenigo, Chemical Weed Control for Sugarcane on Organic Soils of the Everglades, Everglades Station Mimeo Report 62-5, (1961), pp. 1-10 [on-line] retrieved from http://ufdc.ufl.edu/UF00067483/00001, [retrieved on Jan. 16, 2014].

Peng, Developments in Crop Science (4), The Biology and Control of Weeds in Sugarcane, Chapter 12: Application Techniques and Equipment, (1984), pp. 277-295.

Purdue Agriculture, Herbicide Formulations, available online Feb. 7, 2007, obtained at https://www.agriculture.purdue.edu/fnr/html/faculty/holt/nrcasupplement.pdf.

Schobert et al., Reactions of Chelated η3-pentadienyl Iron Complexes with Nucleophiles, Journal of Organometallic Chemistry, vol. 689, (2004), pp. 575-584.

Steward and Nelson, Evaluations of controlled Release PVC and Attaclay Formulations of 2,4-D on Eurasian Watermilfoil, Hyacinth Control Journal, (1972), pp. 35-38, [on-line] retrieved from http://www.apms.org/japm/vol.10/v10p35.pdf, [retrieved on Mar. 6, 2015].

Sugar Cane Product Guide, (2010), pp. 1-4 [on-line] retrieved from http://www.farmoz.com/au/Guide/FARMOZ/Sugar_Cane_Product_Guide.pdf [retrieved on Jan. 16, 2014].

The Pesticide Manual, Fourteenth Edition, Ed. C.D.S. Tomlin, British Crop Production Council, entry 677, 2006, pp. 356-857.

The Pesticide Manual, Fourteenth Edition, Ed., C.D.S. Tomlin, British Crop Production Council, entry 5, 2006, pp. 9-10.

Visavale et al., Granulation and Drying of Modified Clay Incorporated Pesticide Formulation, Drying Technology, vol. 25, No. 7-8, (2007), pp. 1369-1376.

Yeiser, Weed Control and Seedling Performance Using OUST, Velpar, and Velpar+OUST Impregnated Diammonium Phosphate, Faculty Publications, (2002), pp. 260-265, [on-line] retrieved from http://scholarworks.sfasu.edu/cgi/viewcontent.cgi?article=1204&context=forestry, [retrieved on Mar. 6, 2015].

Webster's New World Dictionary, second college edition, The World Publishing Co., NY, (1972), p. 1127.

Office Action, issued in co-pending U.S. Appl. No. 15/740,405, dated Sep. 26, 2018.

Office Action, issued in co-pending U.S. Appl. No. 15/740,031, dated Sep. 26, 2018.

Office Action, issued in co-pending U.S. Appl. No. 15/740,425, dated Sep. 26, 2018.

Office Action, issued in co-pending Application No. 15/743,163, dated Sep. 26, 2018.

Crop Protection Database, Farm Chemical International, pethoxamid, (2013), pp. 881-882.

Office Action, issued in co-pending U.S. Appl. No. 15/543,890, dated Jul. 9, 2018.

Final Office Action, issued in co-pending U.S. Appl. No. 15/024,462, dated Jun. 13, 2017.

Office Action, issued in co-pending U.S. Appl. No. 15/024,462, dated Oct. 3, 2017.

\* cited by examiner

METHOD FOR CONTROLLING HERBICIDE RESISTANT OR TOLERANT WEEDS

This application is a National Stage application of International Application No. PCT/EP2016/066012, filed Jul. 6, 2016, which claims the benefit of U.S. Provisional Application No. 62/190,788, filed Jul. 10, 2015. This application also claims priority under 35 U.S.C. § 119 to European Patent Application No. 15191791.1, filed Oct. 28, 2015.

The present invention relates to methods and uses for controlling herbicide resistant or tolerant weed species by applying the herbicide (±)-2-exo-(2-M ethylbenzyloxy)-1-methyl-4-isopropyl-7-oxabicyclo[2.2.1]heptane, any of its individual enantiomers or any non-racemic mixture of said enantiomers. The methods and uses are particularly suitable for the protection of crops. The invention also relates to specific herbicidal compositions comprising said herbicide.

BACKGROUND OF THE INVENTION

Cases of herbicide-resistant weeds are becoming increasingly common. These biotypes survive herbicide application at doses that usually give effective control of the species. Resistant weed biotypes are a consequence of basic evolutionary processes. Individuals within a species that are best adapted to a particular practice are selected for and will increase in the population. Once a weed population is exposed to a herbicide to which one or more plants are naturally resistant, the herbicide kills susceptible individuals, but allows resistant individuals to survive and reproduce. With repeated herbicide use, resistant weeds that initially appear as isolated plants or patches in a field can quickly spread to dominate the population and the soil seed bank.

For example, herbicide resistance within weeds, in particular grass weeds such as, for example, *Alopecurus myosuroides* (ALOMY), *Apera spica-venti* (APESV) or *Lolium* species (LOLSS) has become a major concern for farmers, resulting in dramatic weed control problems, for example in cereal crops. Herbicides from the group of ACCase- and ALS-inhibitors are most affected by resistance evolution but also various other types of herbicides.

WO 2007/023099 discloses herbicidal mixtures comprising exo-(±)-1-methyl-4-(1-methylethyl)-2-[(2-methylphenyl)methoxy]-7-oxabicyclo[2.2.1]heptane and at least one dinitroaniline herbicide, for example trifluralin and pendimethalin. It is mentioned that these herbicidal mixtures can effect very good control of undesired vegetation, including grass weeds which are resistant or tolerant against certain herbicides.

WO 2007/030886 discloses a herbicidal mixture comprising at least one dinitroaniline herbicide and the herbicidal compound with the IUPAC name 1,4-epoxy-p-2-yl-methyl-benzyl ether which is believed to have a 1RS, 2SR, 4SR stereochemistry (referred to as cinmethylin) and a method of controlling weeds by applying these mixtures. Example 5 discloses that trifluralin and cinmethylin were applied alone and in mixture to a specific dinitroaniline resistant annual ryegrass population.

Herbicide tolerant or resistant weed control by applying a mixture comprising (a) 4-amino-3-chloro-5-fluoro-6-(4-chloro-2-fluoro-3-methoxyphenyl)pyridine-2-carboxylic acid or an agriculturally acceptable ester or salt thereof and (b) an acetyl-CoA carboxylase (ACCase) inhibitor is described in US 2014/0031228 A1.

Nevertheless, there is still a need to further develop practices for preventing, delaying or managing herbicide resistance in weeds.

Further, there is still room for improvement, for example regarding the activity, spectrum of activity and compatibility with useful plants, in particular with regard to the control of resistant weed biotypes.

SUMMARY OF THE INVENTION

Thus, an object of the present invention lies in the effective control of herbicide-resistant weed biotypes, in particular in herbicide-resistant grass weeds.

It is also an object of the present invention to improve the herbicidal activity against undesirable harmful plants and/or the compatibility with the useful plants (in particular crop plants).

These and further objects are achieved by the methods, uses and herbicidal compositions below.

Accordingly, in one aspect of the invention there is provided a method for controlling undesirable vegetation which comprises applying to the vegetation or the locus thereof or applying to the soil or water to prevent the emergence or growth of the undesirable vegetation a herbicidally effective amount of (±)-2-exo-(2-M ethylbenzyloxy)-1-methyl-4-isopropyl-7-oxabicyclo[2.2.1]heptane, any of its individual enantiomers or any non-racemic mixture thereof (herbicide A) wherein the undesirable vegetation comprises at least one herbicide resistant or tolerant weed species.

The term "herbicide A" as used herein is meant to include the racemic mixture (±)-2-exo-(2-Methylbenzyloxy)-1-methyl-4-isopropyl-7-oxabicyclo[2.2.1]heptane (herein also referred to as the "exo-(±)-isomers", CAS RN 87818-31-3)

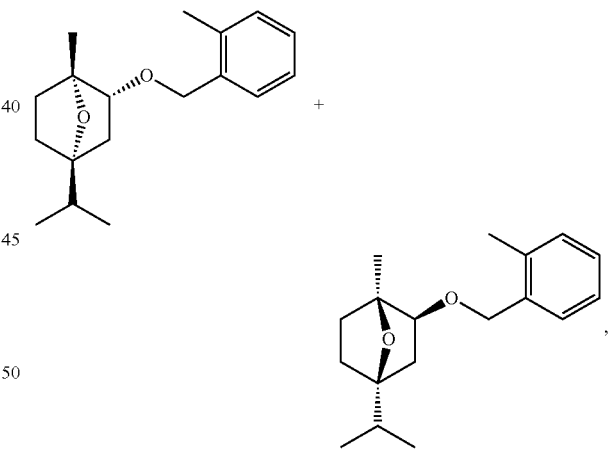

any of its individual enantiomers or any non-racemic mixture thereof. The racemic mixture contains equal parts of the two enantiomers (+)-2-exo-(2-Methylbenzyloxy)-1-methyl-4-isopropyl-7-oxabicyclo[2.2.1]heptane (herein also referred to as the "exo-(+)-isomer", CAS RN 87818-61-9) and (−)-2-exo-(2-Methylbenzyloxy)-1-methyl-4-isopropyl-7-oxabicyclo[2.2.1]heptane (herein also referred to as the "exo-(−)-isomer", CAS RN 87819-60-1). The exo-(±)-isomers, the exo-(+)-isomer and the exo-(−)-isomer including their preparation and herbicidal properties are disclosed in EP 0 081 893 A2 (see Examples 29, 34, 35 and 62). Further preparation methods of these compounds are described in U.S. Pat. No. 4,487,945 (see Embodiments 46 and 48). The racemic mixture (±)-2-exo-(2-Methylbenzyloxy)-1-methyl-4-isopropyl-7-oxabicyclo[2.2.1]heptane is also described in the The Pesticide Manual, Fourteenth Edition, Editor: C. D. S. Tomlin, British Crop Production Council, 2006, entry 157, pages 195-196 with its common name cinmethylin, its IUPAC name (1RS,2SR,4SR)-1,4-epoxy-p-menth-2-yl 2-methylbenzyl ether and its Chemical Abstracts name exo-(±)-1-methyl-4-(1-methylethyl)-2-[(2-methyl phenyl) methoxy]-7-oxabicyclo[2.2.1]heptane.

The term "herbicidally effective amount" denotes an amount of the active ingredients, which is sufficient for controlling unwanted plants, especially for controlling unwanted plants in cultivated plants and which does not result in a substantial damage to the treated plants. Such an amount can vary in a broad range and is dependent on various factors, such as the plants to be controlled, the treated cultivated plant or material, the climatic conditions and the specific composition according to the invention used.

The terms "plants" and "vegetation", as used herein, include germinant seeds, emerging seedlings, plants emerging from vegetative propagules, and established vegetation.

The term "locus", as used herein, means the area in which the vegetation or plants are growing or will grow, typically a field.

The terms "controlling" and "combating", as used herein, are synonyms.

The terms "undesirable vegetation", "harmful plants", "unwanted plants", "weeds" and "weed species", as used herein, are synonyms.

The present invention also relates to the use of (±)-2-exo-(2-Methylbenzyloxy)-1-methyl-4-isopropyl-7-oxabicyclo[2.2.1]heptane, any of its individual enantiomers or any non-racemic mixture thereof (herbicide A) for controlling herbicide resistant or tolerant weed species.

The method of the invention may further comprise applying at least one herbicide B (as defined hereinafter) which is different from the herbicide A. The method of the invention may further comprise applying at least one safener C (as defined hereinafter). The method of the invention may further comprise applying one or more auxiliaries customary in crop protection (as defined hereinafter).

In another aspect, the present invention relates to a method for controlling undesirable vegetation which comprises applying to the vegetation or the locus thereof or applying to the soil or water to prevent the emergence or growth of the undesirable vegetation a composition comprising a herbicidally effective amount of herbicide A. The composition may further comprise at least one herbicide B (as defined hereinafter) and/or at least one safener C (as defined hereinafter) and/or one or more auxiliaries customary in crop protection (as defined hereinafter).

In further aspects, the present invention relates to specific herbicidal compositions comprising a herbicidally effective amount of herbicide A and certain groups of herbicide B as defined hereinafter.

Further embodiments of the invention are evident from the description, the examples and the claims. It is to be understood that the features mentioned above and still to be illustrated below of the subject matter of the invention can be applied not only in the combination given in each particular case but also in other combinations, without leaving the scope of the invention.

DETAILED DESCRIPTION OF THE INVENTION

Surprisingly, it has been found that the herbicidal compound (±)-2-exo-(2-Methylbenzyloxy)-1-methyl-4-isopropyl-7-oxabicyclo[2.2.1]heptane, any of its individual enantiomers or any non-racemic mixture thereof (herbicide A) provides effective control of herbicide resistant or tolerant weed species, in particular herbicide-resistant weed biotypes. For example, herbicide A can effectively control herbicide-resistant grass weeds such as, for example, *Alopecurus myosuroides* (ALOMY), *Apera spica-venti* (APESV), *Phalaris* species (PHASS) or *Lolium* species (LOLSS). Herbicide A is also suitable for controlling herbicide-resistant broadleaf weeds such as, for example, *Papaver rhoeas* (PAPRH, corn poppy) which has evolved resistance, especially against ALS-inhibiting herbicides.

Another advantage of this invention is that herbicide A can be used for controlling weed biotypes with target-site resistance but also weed biotypes with non-target site resistance. A particular advantage of the invention is that herbicide A also provides effective control of weed biotypes having both target-site resistance and non-target-site resistance, such as e.g. resistant populations of *Alopecurus myosuroides* (ALOMY) or *Lolium rigidum* (LOLRI).

"Target-site resistance", as used herein, occurs by mutation within a gene coding for an herbicide target-site enzyme (limiting the herbicide binding) or by overproduction of the target enzyme (gene overexpression or amplification).

"Non-target-site resistance", as used herein, involves mechanisms that minimize the amount of active herbicide reaching the target site (e.g. reduced herbicide uptake or translocation, increased herbicide sequestration, or enhanced herbicide metabolism).

In a preferred embodiment, the herbicide A is (±)-2-exo-(2-Methylbenzyloxy)-1-methyl-4-isopropyl-7-oxabicyclo[2.2.1]heptane.

In another embodiment, the herbicide A is (+)-2-exo-(2-Methylbenzyloxy)-1-methyl-4-isopropyl-7-oxabicyclo[2.2.1]heptane.

In another embodiment, the herbicide A is (−)-2-exo-(2-Methylbenzyloxy)-1-methyl-4-isopropyl-7-oxabicyclo[2.2.1]heptane.

In another embodiment, herbicide A is a non-racemic mixture of (+)-2-exo-(2-Methylbenzyloxy)-1-methyl-4-isopropyl-7-oxabicyclo[2.2.1]heptane and (−)-2-exo-(2-M ethylbenzyloxy)-1-methyl-4-isopropyl-7-oxabicyclo[2.2.1] heptane. The non-racemic mixture contains unequal parts of the exo-(+)-isomer and the exo-(−)-isomer. The weight ratio of the exo-(+)-isomer to the exo-(−)-isomer in the non-racemic mixture can vary widely.

Exemplary herbicide resistant or tolerant weed species include, but are not limited to, biotypes resistant or tolerant to herbicides selected from the group consisting of acetyl CoA carboxylase (ACCase) inhibitors (HRAC Group A), acetolactate synthase (ALS) inhibitors (HRAC Group B), photosystem II (PS II) inhibitors (HRAC Groups C1, C2 and C3), photosystem I (PS I) inhibitors (HRAC Group D), protoporphyrinogen oxidase (PPO) inhibitors (HRAC Group E), hydroxyphenyl-pyruvate-dioxygenase (HPPD) inhibitors (HRAC Group F1), phytoene desaturase (PDS) inhibitors (HRAC Group F2), carotenoid biosynthesis inhibitors (HRAC Group F3), DOXP synthase inhibitors (HRAC Group F4), 5-enolpymvylshikimate-3-phosphate (EPSP) inhibitors (HRAC Group G), glutamine synthetase inhibitors (HRAC Group H), DHP synthase inhibitors (HRAC Group I), inhibitors of microtubuli assembly (HRAC Group K1), inhibitors of mitosis/microtubuli organization (HRAC Group K2), very long chain fatty acid (VLCFA) inhibitors (HRAC Group K3), Inhibitors of cell wall synthesis (HRAC Group L), uncoupler (membran disruption) (HRAC Group M), Inhibitors of lipid synthesis (HRAC Group N), synthetic auxins (HRAC Group O), auxin transport inhibitors (HRAC Group P) and herbicides with unknown mode of action (HRAC Group Z).

Preferably, the herbicide resistant or tolerant weed species is selected from biotypes resistant or tolerant to herbicides selected from the group consisting of acetyl CoA carboxylase (ACCase) inhibitors (HRAC Group A), acetolactate synthase (ALS) inhibitors (HRAC Group B), photosystem II (PS II) inhibitors (HRAC Groups C1, C2 and C3), protoporphyrinogen oxidase (PPO) inhibitors (HRAC Group E), 4-hydroxyphenyl-pyruvate-dioxygenase (HPPD) inhibitors (HRAC Group F1), phytoene desaturase (PDS) inhibitors (HRAC Group F2), 5-enolpymvylshikimate-3-phosphate (EPSP) inhibitors (HRAC Group G), inhibitors of microtubuli assembly (HRAC Group K1), very long chain fatty acid (VLCFA) inhibitors (HRAC Group K3), Inhibitors of cell wall synthesis (HRAC Group L) and inhibitors of lipid synthesis (HRAC Group N).

More preferably, the herbicide resistant or tolerant weed species is selected from biotypes resistant or tolerant to herbicides selected from the group consisting of acetyl CoA carboxylase (ACCase) inhibitors (HRAC Group A), acetolactate synthase (ALS) inhibitors (HRAC Group B), photosystem II (PS II) inhibitors (HRAC Groups C1, C2 and C3), inhibitors of microtubuli assembly (HRAC Group K1), very long chain fatty acid (VLCFA) inhibitors (HRAC Group K3) and inhibitors of lipid synthesis (HRAC Group N).

In particular, the herbicide resistant or tolerant weed species is selected from biotypes with resistance or tolerance to at least one herbicide selected from the group consisting of acetyl CoA carboxylase (ACCase) inhibitors (HRAC Group A), acetolactate synthase (ALS) inhibitors (HRAC Group B) and photosystem II (PS II) inhibitors (HRAC Groups C1, C2 and C3).

In another embodiment, the resistant or tolerant biotype is selected from the genera *Agropyron, Alopecurus, Apera, Avena, Brachiaria, Bromus, Cynodon, Digitaria, Echinochloa, Eleusine, Ischaemum, Leptochloa, Lolium, Panicum, Phalaris, Poa, Rottboellia, Setaria, Anthemis, Amaranthus, Ambrosia, Capsella, Centaurea, Chenopodium, Conyza, Descurainia, Galium, Kochia, Matricaria, Papaver, Raphanus, Sinapis, Sisymbrium, Stellaria* and *Thlaspi*.

Preferably, the resistant or tolerant biotype is selected from the genera *Alopecurus, Apera, Digitaria, Echinochloa, Leptochloa, Lolium, Phalaris, Poa, Setaria, Amaranthus, Anthemis, Capsella, Centaurea, Chenopodium, Descurania, Kochia, Matricaria, Papaver, Sisymbrium, Stellaria* and *Thlaspi*, more preferably selected from the genera *Alopecurus, Apera, Echinochloa, Leptochloa, Lolium, Phalaris, Poa, Amaranthus, Chenopodium, Matricaria, Papaver* and *Stellaria*, even more preferably selected from the genera *Alopecurus, Echinochloa, Lolium, Phalaris, Poa, Amaranthus, Chenopodium, Matricaria, Papaver* and *Stellaria*, yet more preferably selected from the genera *Alopecurus, Echinochloa, Lolium, Phalaris, Poa* and *Papaver* and in particular selected from the genera *Alopecurus, Lolium, Phalaris* and *Papaver*.

In another embodiment, the resistant or tolerant biotype is selected from the genera *Alopecurus, Apera, Digitaria, Echinochloa, Leptochloa, Phalaris, Poa, Setaria, Amaranthus, Anthemis, Capsella, Centaurea, Chenopodium, Descurania, Kochia, Matricaria, Papaver, Sisymbrium, Stellaria* and *Thlaspi*, more preferably selected from the genera *Alopecurus, Apera, Echinochloa, Leptochloa, Phalaris, Poa, Amaranthus, Chenopodium, Matricaria, Papaver* and *Stellaria*, even more preferably selected from the genera *Alopecurus, Echinochloa, Phalaris, Poa, Amaranthus, Chenopodium, Matricaria, Papaver* and *Stellaria*, yet more preferably selected from the genera *Alopecurus, Echinochloa, Phalaris, Poa* and *Papaver* and in particular selected from the genera *Alopecurus, Phalaris* and *Papaver*.

In one embodiment, the resistant or tolerant biotype is a monocotyledonous weed species selected from the genera *Alopecurus, Apera, Digitaria, Echinochloa, Leptochloa, Lolium, Phalaris, Poa* and *Setaria*, preferably selected from the genera *Alopecurus, Apera, Echinochloa, Leptochloa, Lolium, Phalaris* and *Poa*, more preferably selected from the genera *Alopecurus, Echinochloa, Lolium, Phalaris* and *Poa*, and in particular selected from the genera *Alopecurus, Lolium* and *Phalaris*.

In another embodiment, the resistant or tolerant biotype is a monocotyledonous weed species selected from the genera *Alopecurus, Apera, Digitaria, Echinochloa, Leptochloa, Phalaris, Poa* and *Setaria*, preferably selected from the genera *Alopecurus, Apera, Echinochloa, Leptochloa, Phalaris* and *Poa*, more preferably selected from the genera *Alopecurus, Echinochloa, Phalaris* and *Poa*, and in particular selected from the genera *Alopecurus* and *Phalaris*.

In another embodiment, the resistant or tolerant biotype is a dicotyledonous weed species, preferably a dicotyledonous weed species selected from the genera *Amaranthus, Anthemis, Capsella, Centaurea, Chenopodium, Descurania, Kochia, Matricaria, Papaver, Sisymbrium, Stellaria* and *Thlaspi*, more preferably selected from the genera *Amaranthus, Chenopodium, Matricaria, Papaver* and *Stellaria* and in particular selected from the genus *Papaver*.

In another embodiment, the herbicide resistant or tolerant weed species is selected from the genera *Alopecurus, Apera, Lolium, Poa, Phalaris* and *Papaver*.

In another embodiment, the herbicide resistant or tolerant weed species is selected from the genera *Alopecurus, Apera, Lolium, Poa* and *Papaver*.

In another embodiment, the herbicide resistant or tolerant weed species is selected from the genera *Alopecurus, Apera, Poa, Phalaris* and *Papaver*.

In another embodiment, the herbicide resistant or tolerant weed species is selected from the genera *Alopecurus, Apera, Poa* and *Papaver*.

In another embodiment, the herbicide resistant or tolerant weed species is selected from the genera *Alopecurus, Apera* and *Papaver*.

In another embodiment, the herbicide resistant or tolerant weed species is selected from the genera *Alopecurus, Lolium* and *Papaver*.

In another embodiment, the herbicide resistant or tolerant weed species is selected from the genus *Alopecurus* and *Papaver*.

In another embodiment, the herbicide resistant or tolerant weed species is selected from the genera *Apera, Poa* and *Papaver*.

In another embodiment, the herbicide resistant or tolerant weed species is selected from the genera *Apera* and *Papaver*.

In another embodiment, the herbicide resistant or tolerant weed species is selected from the genus *Apera*.

In another embodiment, the herbicide resistant or tolerant weed species is selected from the genus *Papaver*.

In another embodiment, the herbicide resistant or tolerant weed species is selected from the genera *Alopecurus, Apera, Lolium* and *Poa*.

In another embodiment, the herbicide resistant or tolerant weed species is selected from the genera *Alopecurus, Apera* and *Lolium*.

In another embodiment, the herbicide resistant or tolerant weed species is selected from the genera *Alopecurus, Apera* and *Poa*.

In another embodiment, the herbicide resistant or tolerant weed species is selected from the genera *Alopecurus* and *Lolium*.

In another embodiment, the herbicide resistant or tolerant weed species is selected from the genera *Alopecurus* and *Apera*, in particular from the genus *Alopecurus*.

In particular, the resistant or tolerant biotype is selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata, Setaria viridis, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisifolia, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Kochia scoparia, Matricaria chamomilla, Matricaria discoidea, Matricaria inodora, Papaver rhoeas, Raphanus raphanistrum, Sinapis alba, Sinapis arvensis, Sisymbrium officinale, Sisymbrium orientale, Stellaria media* and *Thlaspi arvense*, preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Poa trivialis, Setaria faberi, Setaria glauca, Setaria pumila, Setaria verticillata, Setaria viridis, Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Kochia scoparia, Matricaria chamomilla, Matricaria inodora, Papaver rhoeas, Sisymbrium officinale, Stellaria media* and *Thlaspi arvense*, more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Amaranthus powellii, Amaranthus retroflexus, Amaranthus tuberculatus, Amaranthus rudis, Chenopodium album, Matricaria chamomilla, Matricaria inodora, Papaver rhoeas* and *Stellaria media*, especially preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum, Phalaris minor* and *Poa annua*, and in particular selected from the group consisting of *Alopecurus myosuroides, Lolium multiflorum, Lolium rigidum* and *Phalaris minor*.

In another embodiment, the resistant or tolerant biotype is selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata, Setaria viridis, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisifolia, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Kochia scoparia, Matricaria chamomilla, Matricaria discoidea, Matricaria inodora, Papaver rhoeas, Raphanus raphanistrum, Sinapis alba, Sinapis arvensis, Sisymbrium officinale, Sisymbrium orientale, Stellaria media* and *Thlaspi arvense*, preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Phalaris brachystachys, Phalaris minor, Phalaris paradoxa, Poa annua, Poa trivialis, Setaria faberi, Setaria glauca, Setaria pumila, Setaria verticillata, Setaria viridis, Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Kochia scoparia, Matricaria chamomilla, Matricaria inodora, Papaver rhoeas, Sisymbrium officinale, Stellaria media* and *Thlaspi arvense*, more preferably selected from the group consisting of *Alopecurus myosuroides, Alopecurus aequalis, Apera spica-venti, Echinochloa crus-galli, Echinochloa oryzoides, Leptochloa chinensis, Phalaris brachystachys, Phalaris minor, Phalaris paradoxa, Poa annua, Amaranthus powellii, Amaranthus retroflexus, Amaranthus tuberculatus, Amaranthus rudis, Chenopodium album, Matricaria chamomilla, Matricaria inodora, Papaver rhoeas* and *Stellaria media*, especially preferably selected from the group consisting of *Alopecurus myosuroides, Alopecurus aequalis, Apera spica-venti, Echinochloa crus-galli, Echinochloa oryzoides, Leptochloa chinensis, Phalaris minor* and *Poa annua*, and in particular *Alopecurus myosuroides* or *Phalaris minor*.

In one embodiment, the resistant or tolerant biotype is a monocotyledonous weed species selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Poa trivialis, Setaria faberi, Setaria glauca, Setaria pumila, Setaria verticillata* and *Setaria viridis*, preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa* and *Poa annua*, more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum, Phalaris minor* and *Poa annua* and in particular selected from the group consisting of *Alopecurus myosuroides, Lolium multiflorum, Lolium rigidum* and *Phalaris minor*.

In another embodiment, the resistant or tolerant biotype is a dicotyledonous weed species selected from the group consisting of *Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Kochia scoparia, Matricaria chamomilla, Matricaria inodora, Papaver rhoeas, Sisymbrium officinale, Stellaria media* and *Thlaspi arvense*, preferably selected from the group consisting of *Amaranthus powellii, Amaranthus retroflexus, Amaranthus tuberculatus, Amaranthus rudis, Chenopodium album, Matricaria chamomilla, Matricaria inodora, Papaver rhoeas* and *Stellaria media*, and more preferably *Papaver rhoeas*.

In particular, the methods, uses and compositions of this invention are suitable for controlling ACCase-resistant grass weeds, more specifically ACCase-resistant grass weeds selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata* and *Setaria viridis*, preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Poa trivialis, Setaria faberi, Setaria glauca, Setaria pumilla, Setaria verticillata* and *Setaria viridis*, more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa* and *Poa annua*, especially preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum, Phalaris minor* and *Poa annua*, and in particular selected from the group consisting of *Alopecurus myosuroides, Lolium multiflorum, Lolium rigidum* and *Phalaris minor*.

In another embodiment, the herbicide resistant or tolerant weed species is selected from *Alopecurus myosuroides, Apera spica-venti, Lolium multiflorum, Poa annua, Phalaris minor* and *Papaver rhoeas*.

In another embodiment, the herbicide resistant or tolerant weed species is selected from *Alopecurus myosuroides, Apera spica-venti, Lolium multiflorum, Poa annua* and *Papaver rhoeas*.

In another embodiment, the herbicide resistant or tolerant weed species is selected from *Alopecurus myosuroides, Apera spica-venti, Poa annua, Phalaris minor* and *Papaver rhoeas*.

In another embodiment, the herbicide resistant or tolerant weed species is selected from *Alopecurus myosuroides, Apera spica-venti, Poa annua* and *Papaver rhoeas*.

In another embodiment, the herbicide resistant or tolerant weed species is selected from *Alopecurus myosuroides, Apera spica-venti* and *Papaver rhoeas*.

In another embodiment, the herbicide resistant or tolerant weed species is selected from *Alopecurus myosuroides, Lolium multiflorum* and *Papaver rhoeas*.

In another embodiment, the herbicide resistant or tolerant weed species is *Alopecurus myosuroides* or *Papaver rhoeas*.

In another embodiment, the herbicide resistant or tolerant weed species is selected from *Apera spica-venti, Poa annua* and *Papaver rhoeas*.

In another embodiment, the herbicide resistant or tolerant weed species is *Apera spica-venti* or *Papaver rhoeas*.

In another embodiment, the herbicide resistant or tolerant weed species is selected from *Alopecurus myosuroides, Apera spica-venti, Lolium multiflorum* and *Poa annua*.

In another embodiment, the herbicide resistant or tolerant weed species is selected from *Alopecurus myosuroides, Apera spica-venti* and *Lolium multiflorum*.

In another embodiment, the herbicide resistant or tolerant weed species is selected from *Alopecurus myosuroides, Apera spica-venti* and *Poa annua*.

In another embodiment, the herbicide resistant or tolerant weed species is *Alopecurus myosuroides* or *Lolium multiflorum*.

In another embodiment, the herbicide resistant or tolerant weed species is *Alopecurus myosuroides* or *Apera spica-venti*, in particular *Alopecurus myosuroides*.

The methods, uses and compositions of this invention are also suitable for controlling ALS-resistant grass weeds, more specifically ALS-resistant grass weeds selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata* and *Setaria viridis*, preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris* paradoxa, *Poa annua, Poa trivialis, Setaria faberi, Setaria glauca, Setaria pumilla, Setaria verticillata* and *Setaria viridis*, more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa* and *Poa annua*, especially preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum Phalaris minor* and *Poa annua*, and in particular selected from the group consisting of *Alopecurus myosuroides, Lolium multiflorum, Lolium rigidum* and *Phalaris minor*.

The methods, uses and compositions of this invention are also suitable for controlling ALS-resistant dicotyledonous weeds, more specifically ALS-resistant dicotyledonous weeds selected from the group consisting of *Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisifolia, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Kochia scoparia, Matricaria chamomilla, Matricaria discoidea, Matricaria inodora, Papaver rhoeas, Raphanus raphanistrum, Sinapis alba, Sinapis arvensis, Sisymbrium officinale, Sisymbrium orientale, Stellaria media,* and *Thlaspi arvense*, preferably selected from the group consisting of *Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Kochia scoparia, Matricaria chamomilla, Matricaria inodora, Papaver rhoeas, Sisymbrium officinale, Stellaria media* and *Thlaspi arvense*, more preferably selected from the group consisting of *Amaranthus powellii, Amaranthus retroflexus, Amaranthus tuberculatus, Amaranthus rudis, Chenopodium album, Matricaria chamomilla, Matricaria inodora, Papaver rhoeas* and *Stellaria media*, and in particular *Papaver rhoeas*.

In particular, the methods, uses and compositions of this invention are suitable for controlling PS II-resistant grass weeds, more specifically PS II-resistant grass weeds selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata* and *Setaria viridis*, preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Poa trivialis, Setaria faberi, Setaria glauca, Setaria pumilla, Setaria verticillata* and *Setaria viridis*, more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa* and *Poa annua*, especially preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum, Phalaris minor* and *Poa annua*, and in particular selected from the group consisting of *Alopecurus myosuroides, Lolium multiflorum, Lolium rigidum* and *Phalaris minor*.

The methods, uses and compositions of this invention are also suitable for controlling PSII-resistant dicotyledonous weeds, more specifically PSII-resistant dicotyledonous weeds selected from the group consisting of *Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisifolia, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Kochia scoparia, Matricaria chamomilla, Matricaria discoidea, Matricaria inodora, Papaver rhoeas, Raphanus raphanistrum, Sinapis alba, Sinapis arvensis, Sisymbrium officinale, Sisymbrium orientale, Stellaria media* and *Thlaspi arvense*, preferably selected from the group consisting of *Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Kochia scoparia, Matricaria chamomilla, Matricaria inodora, Papaver rhoeas, Sisymbrium officinale, Stellaria media* and *Thlaspi arvense*, more preferably selected from the group consisting of *Amaranthus powellii, Amaranthus retroflexus, Amaranthus tuberculatus, Amaranthus rudis, Chenopodium album, Matricaria chamomilla, Matricaria inodora, Papaver rhoeas* and *Stellaria media*, and in particular *Papaver rhoeas*.

In one embodiment of the method/use of this invention, the herbicide A is applied alone, i.e. the herbicide A is the only herbicidally active ingredient.

In another embodiment, the herbicide A is applied in combination with at least one further herbicide B selected from the groups b1) to b15):
- b1) lipid biosynthesis inhibitors;
- b2) acetolactate synthase inhibitors (ALS inhibitors);
- b3) photosynthesis inhibitors;
- b4) protoporphyrinogen-IX oxidase inhibitors,
- b5) bleacher herbicides;
- b6) enolpyruvyl shikimate 3-phosphate synthase inhibitors (EPSP inhibitors);
- b7) glutamine synthetase inhibitors;
- b8) 7,8-dihydropteroate synthase inhibitors (DHP inhibitors);
- b9) mitosis inhibitors;
- b10) inhibitors of the synthesis of very long chain fatty acids (VLCFA inhibitors);
- b11) cellulose biosynthesis inhibitors;
- b12) decoupler herbicides;
- b13) synthetic auxins;

b14) auxin transport inhibitors; and
b15) other herbicides selected from the group consisting of bromobutide, chlorflurenol, chlorflurenol-methyl, cumyluron, dalapon, dazomet, difenzoquat, difenzoquat-metilsulfate, dimethipin, DSMA, dymron, endothal and its salts, etobenzanid, flamprop, flamprop-isopropyl, flamprop-methyl, flamprop-M-isopropyl, flamprop-M-methyl, flurenol, flurenol-butyl, flurprimidol, fosamine, fosamine-ammonium, indanofan, indaziflam, maleic hydrazide, mefluidide, metam, methiozolin (CAS 403640-27-7), methyl azide, methyl bromide, methyl-dymron, methyl iodide, MSMA, oleic acid, oxaziclomefone, pelargonic acid, pyributicarb, quinoclamine, triaziflam, tridiphane and 6-chloro-3-(2-cyclopropyl-6-methylphenoxy)-4-pyridazinol (CAS 499223-49-3) and its salts and esters;

and agriculturally acceptable salts, esters or amides thereof.

Preferably, the at least one herbicide B that can be used in combination with the herbicide A is selected from b1) lipid biosynthesis inhibitors:

ACC-herbicides selected from alloxydim, alloxydim-sodium, butroxydim, clethodim, clodinafop, clodinafop-propargyl, cycloxydim, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-P, fluazifop-P-butyl, haloxyfop, haloxyfop-methyl, haloxyfop-P, haloxyfop-P-methyl, metamifop, pinoxaden, profoxydim, propaquizafop, quizalofop, quizalofop-ethyl, quizalofop-tefuryl, quizalofop-P, quizalofop-P-ethyl, quizalofop-P-tefuryl, sethoxydim, tepraloxydim and tralkoxydim, 4-(4'-Chloro-4-cyclopropyl-2'-fluoro[1,1'-biphenyl]-3-yl)-5-hydroxy-2,2,6,6-tetramethyl-2H-pyran-3(6H)-one (CAS 1312337-72-6); 4-(2',4'-Dichloro-4-cyclopropyl[1,1'-biphenyl]-3-yl)-5-hydroxy-2,2,6,6-tetramethyl-2H-pyran-3(6H)-one (CAS 1312337-45-3); 4-(4'-Chloro-4-ethyl-2'-fluoro[1,1'-biphenyl]-3-yl)-5-hydroxy-2,2,6,6-tetramethyl-2H-pyran-3(6H)-one (CAS 1033757-93-5); 4-(2',4'-Dichloro-4-ethyl[1,1'-biphenyl]-3-yl)-2,2,6,6-tetramethyl-2H-pyran-3,5(4H,6H)-dione (CAS 1312340-84-3); 5-(Acetyloxy)-4-(4'-chloro-4-cyclopropyl-2'-fluoro[1,1'-biphenyl]-3-yl)-3,6-dihydro-2,2,6,6-tetramethyl-2H-pyran-3-one (CAS 1312337-48-6); 5-(Acetyloxy)-4-(2',4'-dichloro-4-cyclopropyl-[1,1'-biphenyl]-3-yl)-3,6-dihydro-2,2,6,6-tetramethyl-2H-pyran-3-one; 5-(Acetyloxy)-4-(4'-chloro-4-ethyl-2'-fluoro[1,1'-biphenyl]-3-yl)-3,6-dihydro-2,2,6,6-tetramethyl-2H-pyran-3-one (CAS 1312340-82-1); 5-(Acetyloxy)-4-(2',4'-dichloro-4-ethyl[1,1'-biphenyl]-3-yl)-3,6-dihydro-2,2,6,6-tetramethyl-2H-pyran-3-one (CAS 1033760-55-2); 4-(4'-Chloro-4-cyclopropyl-2'-fluoro[1,1'-biphenyl]-3-yl)-5,6-dihydro-2,2,6,6-tetramethyl-5-oxo-2H-pyran-3-ylcarbonic acid methyl ester (CAS 1312337-51-1); 4-(2',4'-Dichloro-4-cyclopropyl-[1,1'-biphenyl]-3-yl)-5,6-dihydro-2,2,6,6-tetramethyl-5-oxo-2H-pyran-3-ylcarbonic acid methyl ester; 4-(4'-Chloro-4-ethyl-2'-fluoro[1,1'-biphenyl]-3-yl)-5,6-dihydro-2,2,6,6-tetramethyl-5-oxo-2H-pyran-3-ylcarbonic acid methyl ester (CAS 1312340-83-2); 4-(2',4'-Dichloro-4-ethyl[1,1'-biphenyl]-3-yl)-5,6-dihydro-2,2,6,6-tetramethyl-5-oxo-2H-pyran-3-ylcarbonic acid methyl ester (CAS 1033760-58-5); and non ACC herbicides selected from benfuresate, butylate, cycloate, dalapon, dimepiperate, EPTC, esprocarb, ethofumesate, flupropanate, molinate, orbencarb, pebulate, prosulfocarb, TCA, thiobencarb, tiocarbazil, triallate and vernolate;

b2) ALS inhibitors:

sulfonylureas selected from amidosulfuron, azimsulfuron, bensulfuron, bensulfuron-methyl, chlorimuron, chlorimuron-ethyl, chlorsulfuron, cinosulfuron, cyclosulfamuron, ethametsulfuron, ethametsulfuron-methyl, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, iodosulfuron, iodosulfuron-methyl-sodium, iofensulfuron, iofensulfuron-sodium, mesosulfuron, mesosulfuron-methyl, metazosulfuron, metsulfuron, metsulfuron-methyl, nicosulfuron, orthosulfamuron, oxasulfuron, primisulfuron, primisulfuron-methyl, propyrisulfuron, prosulfuron, pyrazosulfuron, pyrazosulfuron-ethyl, rimsulfuron, sulfometuron, sulfometuron-methyl, sulfosulfuron, thifensulfuron, thifensulfuron-methyl, triasulfuron, tribenuron, tribenuron-methyl, trifloxysulfuron, triflusulfuron, triflusulfuron-methyl and tritosulfuron, imidazolinones selected from imazamethabenz, imazamethabenz-methyl, imazamox, imazapic, imazapyr, imazaquin and imazethapyr, triazolopyrimidine herbicides and sulfonanilides selected from cloransulam, cloransulam-methyl, diclosulam, flumetsulam, florasulam, metosulam, penoxsulam, pyrimisulfan and pyroxsulam, pyrimidinylbenzoates selected from bispyribac, bispyribac-sodium, pyribenzoxim, pyriftalid, pyriminobac, pyriminobac-methyl, pyrithiobac, pyrithiobac-sodium, 4-[[[2-[(4,6-dimethoxy-2-pyrimidinyl)oxy]phenyl]methyl]amino]-benzoic acid-1-methylethyl ester (CAS 420138-41-6), 4-[[[2-[(4,6-dimethoxy-2-pyrimidinyl)oxy]phenyl] methyl]amino]-benzoic acid propyl ester (CAS 420138-40-5), N-(4-bromophenyl)-2-[(4,6-dimethoxy-2-pyrimidinyl)oxy]benzenemethanamine (CAS 420138-01-8), sulfonylaminocarbonyl-triazolinone herbicides selected from flucarbazone, flucarbazone-sodium, propoxycarbazone, propoxycarbazone-sodium, thiencarbazone and thiencarbazone-methyl; and triafamone;

b3) photosynthesis inhibitors:

inhibitors of the photosystem II selected from triazine herbicides selected from ametryn, atrazine, cyanazine, desmetryn, dimethametryn, prometon, prometryn, propazine, simazine, simetryn, terbumeton, terbuthylazin, terbutryn and trietazin, triazinones selected from hexazinone, metamitron and metribuzin, triazolinone: amicarbazone, pyridazinone: chloridazon, ureas selected from chlorobromuron, chlorotoluron, chloroxuron, dimefuron, diuron, fluometuron, isoproturon, isouron, linuron, metamitron, methabenzthiazuron, metobenzuron, metoxuron, monolinuron, neburon, siduron, tebuthiuron and thiadiazuron, phenyl carbamates selected from desmedipham, karbutilat, phenmedipham and phenmedipham-ethyl, nitrile herbicides selected from bromofenoxim, bromoxynil, and ioxynil, uracils selected from bromacil, lenacil and terbacil, bentazone, bentazone-sodium, pyridate, pyridafol, pentanochlor, propanil and inhibitors of the photosystem I selected from diquat, diquat-dibromide, paraquat, paraquat-dichloride and paraquat-dimetilsulfate;

b4) protoporphyrinogen-IX oxidase inhibitors: acifluorfen, acifluorfen-sodium, azafenidin, bencarbazone, benzfendizone, bifenox, butafenacil, carfentrazone, carfentrazone-ethyl, chlomethoxyfen, cinidon-ethyl, fluazolate, flufenpyr, flufenpyr-ethyl, flumiclorac, flumiclorac-pentyl, flumioxazin, fluoroglycofen, fluoroglycofen-ethyl, fluthiacet, fluthiacet-methyl, fomesafen, halosafen, lactofen, oxadiargyl, oxadiazon, oxyfluorfen, pentoxazone, profluazol, pyraclonil, pyraflufen, pyraflufen-ethyl, saflufenacil, sulfentrazone, thidiazimin, tiafenacil, trifludimoxazin, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (CAS 353292-31-6; S-3100), N-ethyl-3-(2,6-dichloro-4-trifluoro-methylphenoxy)-5-methyl-1H-pyrazole-1-carboxamide (CAS 452098-92-9), N-tetrahydrofurfuryl-3-(2,6-dichloro-4-trifluoromethylphenoxy)-5-methyl-1H-pyrazole-1-carboxamide (CAS 915396-43-9), N-ethyl-3-(2-chloro-6-fluoro-4-trifluoromethylphenoxy)-5-methyl-1H-pyrazole-1-carboxamide (CAS 452099-05-7), N-tetrahydrofurfuryl-3-(2-chloro-6-fluoro-4-trifluoromethylphenoxy)-5-methyl-1H-pyrazole-1-carboxamide (CAS 452100-03-7), 3-[7-fluoro-3-oxo-4-(prop-2-ynyl)-3,4-dihydro-2H-benzo[1,4]oxazin-6-yl]-1,5-dimethyl-6-thioxo-[1,3,5]triazinan-2,4-dione (CAS 451484-50-7), 2-(2,2,7-trifluoro-3-oxo-4-prop-2-ynyl-3,4-dihydro-2H-benzo[1,4]oxazin-6-yl)-4,5,6,7-tetrahydro-isoindole-1,3-dione (CAS 1300118-96-0), 1-methyl-6-trifluoromethyl-3-(2,2,7-trifluoro-3-oxo-4-prop-2-ynyl-3,4-dihydro-2H-benzo[1,4]oxazin-6-yl)-1H-pyrimidine-2,4-dione (CAS 1304113-05-0), methyl (E)-4-[2-chloro-5-[4-chloro-5-(difluoromethoxy)-1H-methyl-pyrazol-3-yl]-4-fluoro-phenoxy]-3-methoxy-but-2-enoate (CAS 948893-00-3), and 3-[7-chloro-5-fluoro-2-(trifluoromethyl)-1H-benzimidazol-4-yl]-1-methyl-6-(trifluoromethyl)-1H-pyrimidine-2,4-dione (CAS 212754-02-4);

b5) bleacher herbicides:

PDS inhibitors selected from beflubutamid, diflufenican, fluridone, flurochloridone, flurtamone, norflurazon, picolinafen, and 4-(3-trifluoromethylphenoxy)-2-(4-trifluoromethylphenyl)pyrimidine (CAS 180608-33-7), HPPD inhibitors selected from benzobicyclon, benzofenap, bicyclopyrone, fenquintrione, isoxaflutole, isoxachlortole, mesotrione, pyrasulfotole, pyrazolynate, pyrazoxyfen, sulcotrione, tefuryltrione, tembotrione, tolpyralate and topramezone, DOXP-synthase inhibitors selected from clomazone, bleacher with unknown target selected from aclonifen, amitrole and flumeturon;

b6) EPSP synthase inhibitors:

glyphosate, glyphosate-isopropylammonium, glyposate-potassium and glyphosate-trimesium (sulfosate);

b7) glutamine synthase inhibitors: bilanaphos (bialaphos), bilanaphos-sodium, glufosinate, glufosinate-P and glufosinate-ammonium;

b8) DHP synthase inhibitors: asulam;

b9) mitosis inhibitors:

compounds of HRAC group K1: dinitroanilines selected from benfluralin, butralin, dinitramine, ethalfluralin, fluchloralin, oryzalin, pendimethalin, prodiamine and trifluralin, phosphoramidates selected from amiprophos, amiprophos-methyl, and butamiphos, benzoic acid herbicides selected from chlorthal, chlorthal-dimethyl, pyridines selected from dithiopyr and thiazopyr, benzamides selected from propyzamide and tebutam;

compounds of group HRAC K2: carbetamide, chlorpropham, flamprop, flamprop-isopropyl, flamprop-methyl, flamprop-M-isopropyl, flamprop-M-methyl and propham;

b10) VLCFA inhibitors:

chloroacetamides selected from acetochlor, alachlor, butachlor, dimethachlor, dimethenamid, dimethenamid-P, metazachlor, metolachlor, metolachlor-S, pethoxamid, pretilachlor, propachlor, propisochlor and thenylchlor, oxyacetamides selected from flufenacet and mefenacet, acetamides selected from diphenamid, napronilide, napropamide and napropamide-M, tetrazolinones selected from fentrazamide and ipfencarbazone, other herbicides selected from anilofos, cafenstrole, fenoxasulfone, piperophos and pyroxasulfone, and isoxazoline compounds of the formulae II.1, II.2, II.3, II.4, II.5, II.6, II.7, II.8 and II.9

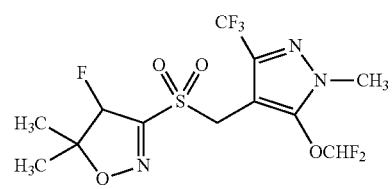

II.1

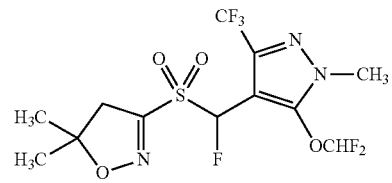

II.2

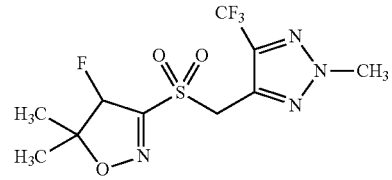

II.3

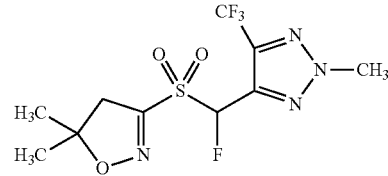

II.4

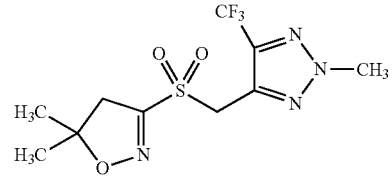

II.5

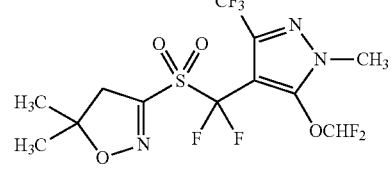

II.6

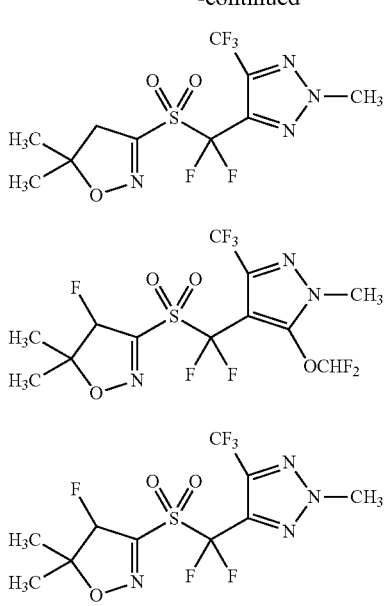

b11) cellulose biosynthesis inhibitors:
chlorthiamid, dichlobenil, flupoxam, indaziflam, isoxaben, triaziflam and 1-cyclohexyl-5-pentafluorphenyloxy-1$^4$-[1,2,4,6]thiatriazin-3-ylamine (CAS 175899-01-1);

b12) decoupler herbicides:
dinoseb, dinoterb and DNOC;

b13) synthetic auxins:
2,4-D, clacyfos, 2,4-DB, aminocyclopyrachlor, aminopyralid, aminopyralid-dimethylammonium, aminopyralid-tris(2-hydroxypropyl)ammonium, benazolin, benazolin-ethyl, chloramben, clomeprop, clopyralid, dicamba, dichlorprop, dichlorprop-P, fluroxypyr, fluroxypyr-butometyl, fluroxypyr-meptyl, halauxifen (CAS 943832-60-8); MCPA, MCPA-thioethyl, MCPB, mecoprop, mecoprop-P, picloram, quinclorac, quinmerac, TBA (2,3,6), triclopyr, 4-amino-3-chloro-6-(4-chloro-2-fluoro-3-methoxyphenyl)-5-fluoropyridine-2-carboxylic acid and benzyl 4-amino-3-chloro-6-(4-chloro-2-fluoro-3-methoxyphenyl)-5-fluoropyridine-2-carboxylate (CAS 1390661-72-9);

b14) auxin transport inhibitors: diflufenzopyr, diflufenzopyr-sodium, naptalam and naptalam-sodium;

b15) other herbicides: bromobutide, chlorflurenol, chlorflurenol-methyl, cumyluron, cyclopyrimorate (CAS 499223-49-3), dalapon, dazomet, difenzoquat, difenzoquat-metilsulfate, dimethipin, DSMA, dymron, endothal, etobenzanid, flurenol, flurenol-butyl, flurprimidol, fosamine, fosamine-ammonium, indanofan, maleic hydrazide, mefluidide, metam, methiozolin (CAS 403640-27-7), methyl azide, methyl bromide, methyl-dymron, methyl iodide, MSMA, oleic acid, oxaziclomefone, pelargonic acid, pyributicarb, quinoclamine and tridiphane;

and agriculturally acceptable salts, esters or amides thereof.

More preferably, the at least one herbicide B that can be used in combination with the herbicide A is selected from b1) from the group of the lipid biosynthesis inhibitors:
clethodim, clodinafop-propargyl, cycloxydim, cyhalofop-butyl, diclofop-methyl, fenoxaprop-P-ethyl, fluazifop-P-butyl, haloxyfop-P-methyl, metamifop, pinoxaden, profoxydim, propaquizafop, quizalofop-P-ethyl, quizalofop-P-tefuryl, sethoxydim, tepraloxydim, tralkoxydim, 4-(4'-Chloro-4-cyclopropyl-2'-fluoro[1,1'-biphenyl]-3-yl)-5-hydroxy-2,2,6,6-tetramethyl-2H-pyran-3(6H)-one (CAS 1312337-72-6); 4-(2',4'-Dichloro-4-cyclopropyl[1,1'-biphenyl]-3-yl)-5-hydroxy-2,2,6,6-tetramethyl-2H-pyran-3(6H)-one (CAS 1312337-45-3); 4-(4'-Chloro-4-ethyl-2'-fluoro[1,1'-biphenyl]-3-yl)-5-hydroxy-2,2,6,6-tetramethyl-2H-pyran-3(6H)-one (CAS 1033757-93-5); 4-(2',4'-Dichloro-4-ethyl[1,1'-biphenyl]-3-yl)-2,2,6,6-tetramethyl-2H-pyran-3,5(4H,6H)-dione (CAS 1312340-84-3); 5-(Acetyloxy)-4-(4'-chloro-4-cyclopropyl-2'-fluoro[1,1'-biphenyl]-3-yl)-3,6-dihydro-2,2,6,6-tetramethyl-2H-pyran-3-one (CAS 1312337-48-6); 5-(Acetyloxy)-4-(2',4'-dichloro-4-cyclopropyl-[1,1'-biphenyl]-3-yl)-3,6-dihydro-2,2,6,6-tetramethyl-2H-pyran-3-one; 5-(Acetyloxy)-4-(4'-chloro-4-ethyl-2'-fluoro[1,1'-biphenyl]-3-yl)-3,6-dihydro-2,2,6,6-tetramethyl-2H-pyran-3-one (CAS 1312340-82-1); 5-(Acetyloxy)-4-(2',4'-dichloro-4-ethyl[1,1'-biphenyl]-3-yl)-3,6-dihydro-2,2,6,6-tetramethyl-2H-pyran-3-one (CAS 1033760-55-2); 4-(4'-Chloro-4-cyclopropyl-2'-fluoro[1,1'-biphenyl]-3-yl)-5,6-dihydro-2,2,6,6-tetramethyl-5-oxo-2H-pyran-3-ylcarbonic acid methyl ester (CAS 1312337-51-1); 4-(2',4'-Dichloro-4-cyclopropyl-[1,1'-biphenyl]-3-yl)-5,6-dihydro-2,2,6,6-tetramethyl-5-oxo-2H-pyran-3-ylcarbonic acid methyl ester; 4-(4'-Chloro-4-ethyl-2'-fluoro[1,1'-biphenyl]-3-yl)-5,6-dihydro-2,2,6,6-tetramethyl-5-oxo-2H-pyran-3-yl carbonic acid methyl ester (CAS 1312340-83-2); 4-(2',4'-Dichloro-4-ethyl[1,1'-biphenyl]-3-yl)-5,6-dihydro-2,2,6,6-tetramethyl-5-oxo-2H-pyran-3-yl carbonic acid methyl ester (CAS 1033760-58-5); benfuresate, dimepiperate, EPTC, esprocarb, ethofumesate, molinate, orbencarb, prosulfocarb, thiobencarb and triallate;

b2) from the group of the ALS inhibitors:
amidosulfuron, azimsulfuron, bensulfuron-methyl, bispyribac-sodium, chlorimuron-ethyl, chlorsulfuron, cloransulam-methyl, cyclosulfamuron, diclosulam, ethametsulfuron-methyl, ethoxysulfuron, flazasulfuron, florasulam, flucarbazone-sodium, flucetosulfuron, flumetsulam, flupyrsulfuron-methyl-sodium, foramsulfuron, halosulfuron-methyl, imazamethabenz-methyl, imazamox, imazapic, imazapyr, imazaquin, imazethapyr, imazosulfuron, iodosulfuron, iodosulfuron-methyl-sodium, iofensulfuron, iofensulfuron-sodium, mesosulfuron, mesosulfuron-methyl, metazosulfuron, metosulam, metsulfuron-methyl, nicosulfuron, orthosulfamuron, oxasulfuron, penoxsulam, primisulfuron-methyl, propoxycarbazon-sodium, propyrisulfuron, prosulfuron, pyrazosulfuron-ethyl, pyribenzoxim, pyrimisulfan, pyriftalid, pyriminobac-methyl, pyrithiobac-sodium, pyroxsulam, rimsulfuron, sulfometuron-methyl, sulfosulfuron, thiencarbazone-methyl, thifensulfuron-methyl, triasulfuron, tribenuron-methyl, trifloxysulfuron, triflusulfuron-methyl, tritosulfuron and triafamone;

b3) from the group of the photosynthesis inhibitors:
ametryn, amicarbazone, atrazine, bentazone, bentazone-sodium, bromoxynil and its salts and esters, chloridazone, chlorotoluron, cyanazine, desmedipham, diquat-dibromide, diuron, fluometuron, hexazinone, ioxynil and its salts and esters, isoproturon, lenacil, linuron, metamitron, methabenzthiazuron, metribuzin, paraquat, paraquat-dichloride, phenmedipham, propanil, pyridate, simazine, terbutryn, terbuthylazine and thidiazuron;

b4) from the group of the protoporphyrinogen-IX oxidase inhibitors:

acifluorfen-sodium, bencarbazone, benzfendizone, butafenacil, carfentrazone-ethyl, cinidon-ethyl, flufenpyr-ethyl, flumiclorac-pentyl, flumioxazin, fluoroglycofen-ethyl, fomesafen, lactofen, oxadiargyl, oxadiazon, oxyfluorfen, pentoxazone, pyraflufen, pyraflufen-ethyl, saflufenacil, sulfentrazone, tiafenacil, trifludimoxazin, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (CAS 353292-31-6; S-3100), N-ethyl-3-(2,6-dichloro-4-trifluoromethylphenoxy)-5-methyl-1H-pyrazole-1-carboxamide (CAS 452098-92-9), N-tetrahydrofurfuryl-3-(2,6-dichloro-4-trifluoromethylphenoxy)-5-methyl-1H-pyrazole-1-carboxamide (CAS 915396-43-9), N-ethyl-3-(2-chloro-6-fluoro-4-trifluoromethylphenoxy)-5-methyl-1H-pyrazole-1-carboxamide (CAS 452099-05-7), N-tetrahydrofurfuryl-3-(2-chloro-6-fluoro-4-trifluoromethylphenoxy)-5-methyl-1H-pyrazole-1-carboxamide (CAS 452100-03-7), 3-[7-fluoro-3-oxo-4-(prop-2-ynyl)-3,4-dihydro-2H-benzo[1,4]oxazin-6-yl]-1,5-dimethyl-6-thioxo-[1,3,5]triazinan-2,4-dione (CAS 451484-50-7), 2-(2,2,7-trifluoro-3-oxo-4-prop-2-ynyl-3,4-dihydro-2H-benzo[1,4]oxazin-6-yl)-4,5,6,7-tetrahydro-isoindole-1,3-dione (CAS 1300118-96-0); 1-methyl-6-trifluoromethyl-3-(2,2,7-trifluoro-3-oxo-4-prop-2-ynyl-3,4-dihydro-2H-benzo[1,4]oxazin-6-yl)-1H-pyrimidine-2,4-dione (CAS 1304113-05-0), and 3-[7-chloro-5-fluoro-2-(trifluoromethyl)-1H-benzimidazol-4-yl]-1-methyl-6-(trifluoromethyl)-1H-pyrimidine-2,4-dione (CAS 212754-02-4);

b5) from the group of the bleacher herbicides:

aclonifen, amitrole, beflubutamid, benzobicyclon, bicyclopyrone, clomazone, diflufenican, fenquintrione, flumeturon, flurochloridone, flurtamone, isoxaflutole, isoxachlortole, mesotrione, norflurazon, picolinafen, pyrasulfotole, pyrazolynate, sulcotrione, tefuryltrione, tembotrione, tolpyralate, topramezone and 4-(3-trifluoromethylphenoxy)-2-(4-trifluoromethylphenyl)pyrimidine (CAS 180608-33-7);

b6) from the group of the EPSP synthase inhibitors:

glyphosate, glyphosate-isopropylammonium, glyphosate-potassium and glyphosate-trimesium (sulfosate);

b7) from the group of the glutamine synthase inhibitors:

glufosinate, glufosinate-P, glufosinate-ammonium;

b8) from the group of the DHP synthase inhibitors:

asulam;

b9) from the group of the mitosis inhibitors:

benfluralin, dithiopyr, ethalfluralin, flamprop, flamprop-isopropyl, flamprop-methyl, flamprop-M-isopropyl, flamprop-M-methyl, oryzalin, pendimethalin, thiazopyr and trifluralin;

b10) from the group of the VLCFA inhibitors:

acetochlor, alachlor, anilofos, butachlor, cafenstrole, dimethenamid, dimethenamid-P, fentrazamide, flufenacet, mefenacet, metazachlor, metolachlor, S-metolachlor, napropanilide, napropamide, napropamide-M, pretilachlor, fenoxasulfone, ipfencarbazone, pyroxasulfone thenylchlor and isoxazoline-compounds of the formulae II.1, II.2, II.3, II.4, II.5, II.6, II.7, II.8 and II.9 as mentioned above;

b11) from the group of the cellulose biosynthesis inhibitors: dichlobenil, flupoxam, indaziflam, isoxaben, triaziflam and 1-cyclohexyl-5-pentafluorphenyloxy-1$^4$-[1,2,4,6]thiatriazin-3-ylamine (CAS 175899-01-1);

b13) from the group of the synthetic auxins:

2,4-D and its salts and esters, aminocyclopyrachlor and its salts and esters, aminopyralid and its salts such as aminopyralid-dimethylammonium, aminopyralid-tris (2-hydroxypropyl)ammonium and its esters, clopyralid and its salts and esters, dicamba and its salts and esters, dichlorprop-P and its salts and esters, fluroxypyr-meptyl, halauxifen and its salts and esters (CAS 943832-60-8), MCPA and its salts and esters, MCPB and its salts and esters, mecoprop-P and its salts and esters, picloram and its salts and esters, quinclorac, quinmerac, triclopyr and its salts and esters, 4-amino-3-chloro-6-(4-chloro-2-fluoro-3-methoxyphenyl)-5-fluoropyridine-2-carboxylic acid and benzyl 4-amino-3-chloro-6-(4-chloro-2-fluoro-3-methoxyphenyl)-5-fluoropyridine-2-carboxylate (CAS 1390661-72-9);

b14) from the group of the auxin transport inhibitors:

diflufenzopyr and diflufenzopyr-sodium;

b15) from the group of the other herbicides: bromobutide, cumyluron, cyclopyrimorate (CAS 499223-49-3) and its salts and esters, dalapon, difenzoquat, difenzoquat-metilsulfate, DSMA, dymron (=daimuron), indanofan, metam, methylbromide, MSMA, oxaziclomefone, pyributicarb and tridiphane.

Especially preferably, the at least one herbicide B that can be used in combination with the herbicide A is selected from b1) from the group of the lipid biosynthesis inhibitors:

clodinafop-propargyl, cycloxydim, cyhalofop-butyl, fenoxaprop-P-ethyl, pinoxaden, profoxydim, quizalofop-p-ethyl, tepraloxydim, tralkoxydim, 4-(4'-Chloro-4-cyclopropyl-2'-fluoro[1,1'-biphenyl]-3-yl)-5-hydroxy-2,2,6,6-tetramethyl-2H-pyran-3(6H)-one (CAS 1312337-72-6); 4-(2',4'-Dichloro-4-cyclopropyl[1,1'-biphenyl]-3-yl)-5-hydroxy-2,2,6,6-tetramethyl-2H-pyran-3(6H)-one (CAS 1312337-45-3); 4-(4'-Chloro-4-ethyl-2'-fluoro[1,1'-biphenyl]-3-yl)-5-hydroxy-2,2,6,6-tetramethyl-2H-pyran-3(6H)-one (CAS 1033757-93-5); 4-(2',4'-Dichloro-4-ethyl[1,1'-biphenyl]-3-yl)-2,2,6,6-tetramethyl-2H-pyran-3,5(4H,6H)-dione (CAS 1312340-84-3); 5-(Acetyloxy)-4-(4'-chloro-4-cyclopropyl-2'-fluoro[1,1-biphenyl]-3-yl)-3,6-dihydro-2,2,6,6-tetramethyl-2H-pyran-3-one (CAS 1312337-48-6); 5-(Acetyloxy)-4-(2',4'-dichloro-4-cyclopropyl-[1,1'-biphenyl]-3-yl)-3,6-dihydro-2,2,6,6-tetramethyl-2H-pyran-3-one; 5-(Acetyloxy)-4-(4'-chloro-4-ethyl-2'-fluoro[1,1'-biphenyl]-3-yl)-3,6-dihydro-2,2,6,6-tetramethyl-2H-pyran-3-one (CAS 1312340-82-1); 5-(Acetyloxy)-4-(2',4'-dichloro-4-ethyl[1,1'-biphenyl]-3-yl)-3,6-dihydro-2,2,6,6-tetramethyl-2H-pyran-3-one (CAS 1033760-55-2); 4-(4'-Chloro-4-cyclopropyl-2'-fluoro[1,1'-biphenyl]-3-yl)-5,6-dihydro-2,2,6,6-tetramethyl-5-oxo-2H-pyran-3-ylcarbonic acid methyl ester (CAS 1312337-51-1); 4-(2',4'-Dichloro-4-cyclopropyl-[1,1'-biphenyl]-3-yl)-5,6-dihydro-2,2,6,6-tetramethyl-5-oxo-2H-pyran-3-ylcarbonic acid methyl ester; 4-(4'-Chloro-4-ethyl-2'-fluoro[1,1'-biphenyl]-3-yl)-5,6-dihydro-2,2,6,6-tetramethyl-5-oxo-2H-pyran-3-yl carbonic acid methyl ester (CAS 1312340-83-2); 4-(2',4'-Dichloro-4-ethyl[1,1'-biphenyl]-3-yl)-5,6-dihydro-2,2,6,6-tetramethyl-5-oxo-2H-pyran-3-ylcarbonic acid methyl ester (CAS 1033760-58-5); esprocarb, prosulfocarb, thiobencarb and triallate;

b2) from the group of the ALS inhibitors: azimsulfuron, bensulfuron-methyl, bispyribac-sodium, cyclosulfamuron, diclosulam, ethametsulfuron-methyl, ethoxysulfuron, flumetsulam, flupyrsulfuron-methyl-sodium, foramsulfuron, imazamox, imazapic, imazapyr, imazaquin, imazethapyr, imazosulfuron, iodosulfuron, iodosulfuron-methyl-sodium, iofensulfuron, iofensulfuron-sodium, mesosulfuron, mesosulfuron-methyl, metazosulfuron, nicosulfuron, penoxsulam, propoxycarbazon-sodium, propyrisulfuron, pyrazosulfuron-ethyl, pyroxsulam, rimsulfuron, sulfosulfuron, thiencarbazon-methyl, tritosulfuron and triafamone;

b3) from the group of the photosynthesis inhibitors: ametryn, atrazine, chlorotoluron, diuron, fluometuron, hexazinone, isoproturon, linuron, metribuzin, paraquat, paraquat-dichloride, propanil, terbutryn and terbuthylazine;

b4) from the group of the protoporphyrinogen-IX oxidase inhibitors: flumioxazin, oxyfluorfen, pyraflufen, pyraflufen-ethyl, saflufenacil, sulfentrazone, trifludimoxazin, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (CAS 353292-31-6; S-3100), 3-[7-fluoro-3-oxo-4-(prop-2-ynyl)-3,4-dihydro-2H-benzo[1,4]oxazin-6-yl]-1,5-dimethyl-6-thioxo-[1,3,5]triazinan-2,4-dione (CAS 451484-50-7), 2-(2,2,7-trifluoro-3-oxo-4-prop-2-ynyl-3,4-dihydro-2H-benzo[1,4]oxazin-6-yl)-4,5,6,7-tetrahydro-isoindole-1,3-dione (CAS 1300118-96-0), and 1-methyl-6-trifluoromethyl-3-(2,2,7-trifluoro-3-oxo-4-prop-2-ynyl-3,4-dihydro-2H-benzo[1,4]oxazin-6-yl)-1H-pyrimidine-2,4-dione (CAS 1304113-05-0);

b5) from the group of the bleacher herbicides: amitrole, bicyclopyrone, clomazone, diflufenican, fenquintrione, flumeturon, flurtamone, flurochloridone, isoxaflutole, isoxachlortole, mesotrione, picolinafen, sulcotrione, tefuryltrione, tembotrione, tolpyralate and topramezone;

b6) from the group of the EPSP synthase inhibitors: glyphosate, glyphosate-isopropylammonium and glyphosate-trimesium (sulfosate);

b7) from the group of the glutamine synthase inhibitors: glufosinate, glufosinate-P and glufosinate-ammonium;

b9) from the group of the mitosis inhibitors: pendimethalin and trifluralin;

b10) from the group of the VLCFA inhibitors: acetochlor, cafenstrole, dimethenamid-P, fentrazamide, flufenacet, mefenacet, metazachlor, metolachlor, S-metolachlor, fenoxasulfone, ipfencarbazone and pyroxasulfone; likewise, preference is given to isoxazoline compounds of the formulae II.1, II.2, II.3, II.4, II.5, II.6, II.7, II.8 and II.9 as mentioned above;

b11) from the group of the cellulose biosynthesis inhibitors: indaziflam, isoxaben and triaziflam;

b13) from the group of the synthetic auxins: 2,4-D and its salts and esters such as clacyfos, and aminocyclopyrachlor and its salts and esters, aminopyralid and its salts and its esters, clopyralid and its salts and esters, dicamba and its salts and esters, fluroxypyr-meptyl, halauxifen, halauxifen-methyl, quinclorac, quinmerac, 4-amino-3-chloro-6-(4-chloro-2-fluoro-3-methoxyphenyl)-5-fluoropyridine-2-carboxylic acid and benzyl 4-amino-3-chloro-6-(4-chloro-2-fluoro-3-methoxyphenyl)-5-fluoropyridine-2-carboxylate (CAS 1390661-72-9);

b14) from the group of the auxin transport inhibitors: diflufenzopyr and diflufenzopyr-sodium, b15) from the group of the other herbicides: dymron (=daimuron), indanofan, oxaziclomefone.

In particular, the at least one herbicide B is selected from the herbicides B.1-B.224 as listed below in table B:

TABLE B

| | Herbicide B |
|---|---|
| B.1 | clethodim |
| B.2 | clodinafop-propargyl |
| B.3 | cycloxydim |
| B.4 | cyhalofop |
| B.5 | cyhalofop-butyl |
| B.6 | fenoxaprop-ethyl |
| B.7 | fenoxaprop-P-ethyl |
| B.8 | metamifop |
| B.9 | pinoxaden |
| B.10 | profoxydim |
| B.11 | sethoxydim |
| B.12 | tepraloxydim |
| B.13 | tralkoxydim |
| B.14 | esprocarb |
| B.15 | ethofumesate |
| B.16 | molinate |
| B.17 | prosulfocarb |
| B.18 | thiobencarb |
| B.19 | triallate |
| B.20 | azimsulfuron |
| B.21 | bensulfuron-methyl |
| B.22 | bispyribac |
| B.23 | bispyribac-sodium |
| B.24 | cloransulam-methyl |
| B.25 | chlorsulfuron |
| B.26 | clorimuron |
| B.27 | cyclosulfamuron |
| B.28 | ethoxysulfuron |
| B.29 | diclosulam |
| B.30 | florasulam |
| B.31 | flumetsulam |
| B.32 | flupyrsulfuron-methyl-sodium |
| B.33 | foramsulfuron |
| B.34 | imazamox |
| B.35 | imazamox-ammonium |
| B.36 | imazapic |
| B.37 | imazapic-ammonium |
| B.38 | imazapic-isopropylammonium |
| B.39 | imazapyr |
| B.40 | imazapyr-ammonium |
| B.41 | imazapyr-isopropylammonium |
| B.42 | imazaquin |
| B.43 | imazaquin-ammonium |
| B.44 | imazethapyr |
| B.45 | imazethapyr-ammonium |
| B.46 | imazethapyr-isopropylammonium |
| B.47 | imazosulfuron |
| B.48 | iodosulfuron-methyl-sodium |
| B.49 | iofensulfuron |
| B.50 | iofensulfuron-sodium |
| B.51 | mesosulfuron-methyl |
| B.52 | metazosulfuron |
| B.53 | metsulfuron-methyl |
| B.54 | metosulam |
| B.55 | nicosulfuron |
| B.56 | penoxsulam |
| B.57 | propoxycarbazon-sodium |
| B.58 | pyrazosulfuron-ethyl |
| B.59 | pyribenzoxim |
| B.60 | pyriftalid |
| B.61 | pyroxsulam |
| B.62 | propyrisulfuron |
| B.63 | rimsulfuron |
| B.64 | sulfosulfuron |
| B.65 | thiencarbazone-methyl |
| B.66 | thifensulfuron-methyl |
| B.67 | tribenuron-methyl |
| B.68 | tritosulfuron |

TABLE B-continued

| | Herbicide B |
|---|---|
| B.69 | triafamone |
| B.70 | ametryne |
| B.71 | atrazine |
| B.72 | bentazone |
| B.73 | bentazone-sodium |
| B.74 | bromoxynil |
| B.75 | bromoxynil-octanoate |
| B.76 | bromoxynil-heptanoate |
| B.77 | bromoxynil-potassium |
| B.78 | diuron |
| B.79 | fluometuron |
| B.80 | hexazinone |
| B.81 | chlorotoluron |
| B.82 | isoproturon |
| B.83 | linuron |
| B.84 | metamitron |
| B.85 | metribuzin |
| B.86 | propanil |
| B.87 | simazin |
| B.88 | terbuthylazine |
| B.89 | terbutryn |
| B.90 | paraquat-dichloride |
| B.91 | acifluorfen |
| B.92 | butafenacil |
| B.93 | carfentrazone-ethyl |
| B.94 | flumioxazin |
| B.95 | fomesafen |
| B.96 | oxadiargyl |
| B.97 | oxyfluorfen |
| B.98 | pyraflufen |
| B.99 | pyraflufen-ethyl |
| B.100 | saflufenacil |
| B.101 | sulfentrazone |
| B.102 | trifludimoxazin |
| B.103 | ethyl [3-[2-chloro-4-fluoro-5-(1-methyl-6-trifluoromethyl-2,4-dioxo-1,2,3,4-tetrahydro-pyrimidin-3-yl)phenoxy]-2-pyridyloxy]acetate (CAS 353292-31-6) |
| B.104 | benzobicyclon |
| B.105 | bicyclopyrone |
| B.106 | clomazone |
| B.107 | diflufenican |
| B.108 | flurtamone |
| B.109 | flurochloridone |
| B.110 | isoxaflutole |
| B.111 | mesotrione |
| B.112 | norflurazon |
| B.113 | picolinafen |
| B.114 | sulcotrione |
| B.115 | tefuryltrione |
| B.116 | tembotrione |
| B.117 | tolpyralate |
| B.118 | topramezone |
| B.119 | topramezone-sodium |
| B.120 | amitrole |
| B.121 | fluometuron |
| B.122 | fenquintrione |
| B.123 | glyphosate |
| B.124 | glyphosate-ammonium |
| B.125 | glyphosate-dimethylammonium |
| B.126 | glyphosate-isopropylammonium |
| B.127 | glyphosate-trimesium (sulfosate) |
| B.128 | glyphosate-potassium |
| B.129 | glufosinate |
| B.130 | glufosinate-ammonium |
| B.131 | glufosinate-P |
| B.132 | glufosinate-P-ammonium |
| B.133 | pendimethalin |
| B.134 | trifluralin |
| B.135 | acetochlor |
| B.136 | butachlor |
| B.137 | cafenstrole |
| B.138 | dimethenamid-P |
| B.139 | fentrazamide |
| B.140 | flufenacet |
| B.141 | mefenacet |
| B.142 | metazachlor |
| B.143 | metolachlor |
| B.144 | S-metolachlor |
| B.145 | dimethachlor |
| B.146 | napropamide |
| B.147 | napropamide-M |
| B.148 | pethoxamid |
| B.149 | pretilachlor |
| B.150 | fenoxasulfone |
| B.151 | indaziflam |
| B.152 | isoxaben |
| B.153 | triaziflam |
| B.154 | ipfencarbazone |
| B.155 | pyroxasulfone |
| B.156 | 2,4-D |
| B.157 | 2,4-D-isobutyl |
| B.158 | 2,4-D-dimethylammonium |
| B.159 | 2,4-D-N,N,N-trimethylethanolammonium |
| B.160 | aminopyralid |
| B.161 | aminopyralid-methyl |
| B.162 | aminopyralid-dimethyl-ammonium |
| B.163 | aminopyralid-tris(2-hydroxypropyl)ammonium |
| B.164 | clopyralid |
| B.165 | clopyralid-methyl |
| B.166 | clopyralid-olamine |
| B.167 | dicamba |
| B.168 | dicamba-butotyl |
| B.169 | dicamba-diglycolamine |
| B.170 | dicamba-dimethylammonium |
| B.171 | dicamba-diolamine |
| B.172 | dicamba-isopropylammonium |
| B.173 | dicamba-potassium |
| B.174 | dicamba-sodium |
| B.175 | dicamba-trolamine |
| B.176 | dicamba-N,N-bis-(3-aminopropyl)methylamine |
| B.177 | dicamba-diethylenetriamine |
| B.178 | fluroxypyr |
| B.179 | fluroxypyr-meptyl |
| B.180 | halauxifen |
| B.181 | halauxifen-methyl |
| B.182 | MCPA |
| B.183 | MCPA-2-ethylhexyl |
| B.184 | MCPA-dimethylammonium |
| B.185 | quinclorac |
| B.186 | quinclorac-dimethylammonium |
| B.187 | quinmerac |
| B.188 | quinmerac-dimethylammonium |
| B.189 | 4-amino-3-chloro-6-(4-chloro-2-fluoro-3-methoxyphenyl)-5-fluoropyridine-2-carboxylic acid |
| B.190 | benzyl 4-amino-3-chloro-6-(4-chloro-2-fluoro-3-methoxyphenyl)-5-fluoropyridine-2-carboxylate (CAS 1390661-72-9) |
| B.191 | aminocyclopyrachlor |
| B.192 | aminocyclopyrachlor-potassium |
| B.193 | aminocyclopyrachlor-methyl |
| B.194 | diflufenzopyr |
| B.195 | diflufenzopyr-sodium |
| B.196 | dymron |
| B.197 | indanofan |
| B.198 | oxaziclomefone |
| B.199 | II.1 |
| B.200 | II.2 |
| B.201 | II.3 |
| B.202 | II.4 |
| B.203 | II.5 |

TABLE B-continued

| | Herbicide B |
|---|---|
| B.204 | II.6 |
| B.205 | II.7 |
| B.206 | II.8 |
| B.207 | II.9 |
| B.208 | aclonifen |
| B.209 | bifenox |
| B.210 | butralin |
| B.211 | halosulfuron |
| B.212 | halosulfuron-methyl |
| B.213 | oxadiazon |
| B.214 | piperophos |
| B.215 | pyrimisulfan |
| B.216 | quizalofop |
| B.217 | quizalofop-P-ethyl |
| B.218 | pyriminobac |
| B.219 | pyriminobac-methyl |
| B.220 | benzofenap |
| B.221 | isoxachlortole |
| B.222 | pyrazolynate |
| B.223 | pyrazoxyfen |
| B.224 | methiozolin (CAS 403640-27-7) |

In addition to the herbicide A and the optional herbicide B, the method of this invention may further comprise applying at least one safener C.

Therefore, in one embodiment, the method of the present invention comprises applying herbicide A, at least one safener C and optionally at least one herbicide B.

In another embodiment, the method of the present invention comprises applying herbicide A, at least one herbicide B and at least one safener C.

Safeners are chemical compounds which prevent or reduce damage on useful plants without having a major impact on the herbicidal action of the herbicidal active components towards unwanted plants. Safeners can be applied before sowings (e.g. seed treatments), on shoots or seedlings as well as in the pre-emergence or post-emergence treatment of useful plants and their habitat.

Suitable safeners are e.g. (quinolin-8-oxy)acetic acids, 1-phenyl-5-haloalkyl-1H-1,2,4-triazol-3-carboxylic acids, 1-phenyl-4,5-dihydro-5-alkyl-1H-pyrazol-3,5-dicarboxylic acids, 4,5-dihydro-5,5-diaryl-3-isoxazol carboxylic acids, dichloroacetamides, alpha-oximinophenylacetonitriles, acetophenonoximes, 4,6-dihalo-2-phenylpyrimidines, N-[[4-(aminocarbonyl)phenyl]sulfonyl]-2-benzoic amides, 1,8-naphthalic anhydride, 2-halo-4-(haloalkyl)-5-thiazol carboxylic acids, phosphorthiolates and N-alkyl-O-phenyl-carbamates and their agriculturally acceptable salts and their agriculturally acceptable derivatives such amides, esters, and thioesters, provided they have an acid group.

Examples of preferred safeners C are benoxacor, cloquintocet, cyometrinil, cyprosulfamide, dichlormid, dicyclonon, dietholate, fenchlorazole, fenclorim, flurazole, fluxofenim, furilazole, isoxadifen, mefenpyr, mephenate, naphthaleneacetic acid (NAA), naphthalic anhydride (NA), oxabetrinil, 4-(dichloroacetyl)-1-oxa-4-azaspiro[4.5]decane (MON4660, CAS 71526-07-3), 2,2,5-trimethyl-3-(dichloroacetyl)-1,3-oxazolidine (R-29148, CAS 52836-31-4), N-(2-Methoxybenzoyl)-4-[(methylaminocarbonyl)amino]benzenesulfonamide (CAS 129531-12-0) and agriculturally acceptable salts, esters or amides thereof.

Especially preferred safeners C are benoxacor, cloquintocet, cyprosulfamide, dichlormid, fenchlorazole, fenclorim, flurazole, fluxofenim, furilazole, isoxadifen, mefenpyr, naphthalic anhydride (NA), oxabetrinil, 4-(dichloroacetyl)-1-oxa-4-azaspiro[4.5]decane (MON4660, CAS 71526-07-3), 2,2,5-trimethyl-3-(dichloroacetyl)-1,3-oxazolidine (R-29148, CAS 52836-31-4), N-(2-M ethoxybenzoyl)-4-[(methylami nocarbonyl)amino]benzenesulfonamide (CAS 129531-12-0) and agriculturally acceptable salts, esters or amides thereof.

In particular, the at least one safener C is selected from the safeners C.1 to C.17 as listed below in table C:

TABLE C

| | Safener C |
|---|---|
| C.1 | benoxacor |
| C.2 | cloquintocet |
| C.3 | cloquintocet-mexyl |
| C.4 | cyprosulfamide |
| C.5 | dichlormid |
| C.6 | fenchlorazole |
| C.7 | fenchlorazole-ethyl |
| C.8 | fenclorim |
| C.9 | furilazole |
| C.10 | isoxadifen |
| C.11 | isoxadifen-ethyl |
| C.12 | mefenpyr |
| C.13 | mefenpyr-diethyl |
| C.14 | naphthalic anhydride (NA) |
| C.15 | 4-(dichloroacetyl)-1-oxa-4-azaspiro[4.5]decane (MON4660, CAS 71526-07-3) |
| C.16 | 2,2,5-trimethyl-3-(dichloroacetyl)-1,3-oxazolidine (R-29148, CAS 52836-31-4) |
| C.17 | N-(2-Methoxybenzoyl)-4-[(methylaminocarbonyl)-amino]benzenesulfonamide (CAS 129531-12-0) |

The herbicides B and safeners C are known herbicides and safeners, see, for example, The Pesticide Manual, British Crop Protection Council, 16$^{th}$ edition, 2012; The Compendium of Pesticide Common Names (http://www.alanwood.net/pesticides/); Farm Chemicals Handbook 2000 volume 86, Meister Publishing Company, 2000; B. Hock, C. Fedtke, R. R. Schmidt, Herbizide [Herbicides], Georg Thieme Verlag, Stuttgart 1995; W. H. Ahrens, Herbicide Handbook, 7th edition, Weed Science Society of America, 1994; and K. K. Hatzios, Herbicide Handbook, Supplement for the 7th edition, Weed Science Society of America, 1998. 2,2,5-Trimethyl-3-(dichloroacetyl)-1,3-oxazolidine [CAS No. 52836-31-4] is also referred to as R-29148. 4-(Dichloroacetyl)-1-oxa-4-azaspiro[4.5]decane [CAS No. 71526-07-3] is also referred to as AD-67 and MON 4660.

If the herbicides B and/or safeners C as described herein are capable of forming geometrical isomers, for example E/Z isomers, it is possible to use both, the pure isomers and mixtures thereof, in the methods, uses and compositions according to the invention.

If the herbicides B and/or safeners C as described herein have one or more centers of chirality and, as a consequence, are present as enantiomers or diastereomers, it is possible to use both, the pure enantiomers and diastereomers and their mixtures, in the methods, uses and compositions according to the invention.

If the herbicides B and/or safeners C as described herein have ionizable functional groups, they can also be employed in the form of their agriculturally acceptable salts. The term "agriculturally acceptable salts" is used herein to mean in general, the salts of those cations and the acid addition salts of those acids whose cations and anions, respectively, have no adverse effect on the herbicidal activity of the active compounds.

Preferred cations are the ions of the alkali metals, preferably of lithium, sodium and potassium, of the alkaline earth metals, preferably of calcium and magnesium, and of the transition metals, preferably of manganese, copper, zinc and iron, further ammonium and substituted ammonium in which one to four hydrogen atoms are replaced by $C_1$-$C_4$-alkyl, hydroxy-$C_1$-$C_4$-alkyl, $C_1$-$C_4$-alkoxy-$C_1$-$C_4$-alkyl, hydroxy-$C_1$-$C_4$-alkoxy-$C_1$-$C_4$-alkyl, phenyl or benzyl, preferably ammonium, methylammonium, isopropylammonium, dimethylammonium, diisopropylammonium, trimethylammonium, heptylammonium, dodecylammonium, tetradecylammonium, tetramethylammonium, tetraethylammonium, tetrabutylammonium, 2-hydroxyethylammonium (olamine salt), 2-(2-hydroxyeth-1-oxy)eth-1-ylammonium (diglycolamine salt), di(2-hydroxyeth-1-yl)ammonium (diolamine salt), tris(2-hydroxyethyl)ammonium (trolamine salt), tris(2-hydroxypropyl)ammonium, benzyltrimethylammonium, benzyltriethylammonium, N,N,N-trimethylethanolammonium (choline salt), furthermore phosphonium ions, sulfonium ions, preferably tri($C_1$-$C_4$-alkyl)sulfonium, such as trimethylsulfonium, and sulfoxonium ions, preferably tri($C_1$-$C_4$-alkyl)sulfoxonium, and finally the salts of polybasic amines such as N,N-bis-(3-aminopropyl)methylamine and diethylenetriamine.

Anions of useful acid addition salts are primarily chloride, bromide, fluoride, iodide, hydrogensulfate, methylsulfate, sulfate, dihydrogenphosphate, hydrogenphosphate, nitrate, bicarbonate, carbonate, hexafluorosilicate, hexafluorophosphate, benzoate and also the anions of $C_1$-$C_4$-alkanoic acids, preferably formate, acetate, propionate and butyrate.

The herbicides B and/or safeners C as described herein having a carboxyl, hydroxy and/or an lamino group can be employed in the form of the acid, in the form of an agriculturally suitable salt as mentioned above or else in the form of an agriculturally acceptable derivative, for example as amides, such as mono- and di-$C_1$-$C_6$-alkylamides or arylamides, as esters, for example as allyl esters, propargyl esters, $C_1$-$C_{10}$-alkyl esters, alkoxyalkyl esters, tefuryl ((tetrahydrofuran-2-yl)methyl) esters and also as thioesters, for example as $C_1$-$C_{10}$-alkylthio esters. Preferred mono- and di-$C_1$-$C_6$-alkylamides are the methyl and the dimethylamides. Preferred arylamides are, for example, the anilides and the 2-chloroanilides. Preferred alkyl esters are, for example, the methyl, ethyl, propyl, isopropyl, butyl, isobutyl, pentyl, mexyl (1-methylhexyl), meptyl (1-methylheptyl), heptyl, octyl or isooctyl (2-ethylhexyl) esters. Preferred $C_1$-$C_4$-alkoxy-$C_1$-$C_4$-alkyl esters are the straight-chain or branched $C_1$-$C_4$-alkoxy ethyl esters, for example the 2-methoxyethyl, 2-ethoxyethyl, 2-butoxyethyl (butotyl), 2-butoxypropyl or 3-butoxypropyl ester. An example of a straight-chain or branched $C_1$-$C_{10}$-alkylthio ester is the ethylthio ester.

In the case of dicamba, suitable salts include those, where the counterion is an agriculturally acceptable cation. For example, suitable salts of dicamba are dicamba-sodium, dicamba-potassium, dicamba-methylammonium, dicamba-dimethylammonium, dicamba-isopropylammonium, dicamba-diglycolamine, dicamba-olamine, dicamba-diolamine, dicamba-trolamine, dicamba-N,N-bis-(3-aminopropyl)methylamine and dicamba-diethylenetriamine. Examples of a suitable ester are dicamba-methyl and dicamba-butotyl.

Suitable salts of 2,4-D are 2,4-D-ammonium, 2,4-D-dimethylammonium, 2,4-D-diethylammonium, 2,4-D-diethanolammonium (2,4-D-diolamine), 2,4-D-triethanolammonium, 2,4-D-isopropylammonium, 2,4-D-triisopropanolammonium, 2,4-D-heptylammonium, 2,4-D-dodecylammonium, 2,4-D-tetradecylammonium, 2,4-D-triethylammonium, 2,4-D-tris(2-hydroxypropyl)ammonium, 2,4-D-tris(isopropyl)ammonium, 2,4-D-trolamine, 2,4-D-lithium, 2,4-D-sodium. Examples of suitable esters of 2,4-D are 2,4-D-butotyl, 2,4-D-2-butoxypropyl, 2,4-D-3-butoxypropyl, 2,4-D-butyl, 2,4-D-ethyl, 2,4-D-ethylhexyl, 2,4-D-isobutyl, 2,4-D-isooctyl, 2,4-D-isopropyl, 2,4-D-meptyl, 2,4-D-methyl, 2,4-D-octyl, 2,4-D-pentyl, 2,4-D-propyl, 2,4-D-tefuryl and clacyfos.

Suitable salts of 2,4-DB are for example 2,4-DB-sodium, 2,4-DB-potassium and 2,4-DB-dimethylammonium. Suitable esters of 2,4-DB are for example 2,4-DB-butyl and 2,4-DB-isoctyl.

Suitable salts of dichlorprop are for example dichlorprop-sodium, dichlorprop-potassium and dichlorprop-dimethylammonium. Examples of suitable esters of dichlorprop are dichlorprop-butotyl and dichlorprop-isoctyl.

Suitable salts and esters of MCPA include MCPA-butotyl, MCPA-butyl, MCPA-dimethyl-ammonium, MCPA-diolamine, MCPA-ethyl, MCPA-thioethyl, MCPA-2-ethylhexyl, MCPA-isobutyl, MCPA-isoctyl, MCPA-isopropyl, MCPA-isopropylammonium, MCPA-methyl, MCPA-olamine, MCPA-potassium, MCPA-sodium and MCPA-trolamine.

A suitable salt of MCPB is MCPB sodium. A suitable ester of MCPB is MCPB-ethyl.

Suitable salts of clopyralid are clopyralid-potassium, clopyralid-olamine and clopyralid-tris-(2-hydroxypropyl) ammonium. Example of suitable esters of clopyralid is clopyralid-methyl.

Examples of a suitable ester of fluroxypyr are fluroxypyr-meptyl and fluroxypyr-2-butoxy-1-methylethyl, wherein fluroxypyr-meptyl is preferred.

Suitable salts of picloram are picloram-dimethylammonium, picloram-potassium, picloram-triisopropanolammonium, picloram-triisopropylammonium and picloram-trolamine. A suitable ester of picloram is picloram-isoctyl.

A suitable salt of triclopyr is triclopyr-triethylammonium. Suitable esters of triclopyr are for example triclopyr-ethyl and triclopyr-butotyl.

Suitable salts and esters of chloramben include chloramben-ammonium, chloramben-diolamine, chloramben-methyl, chloramben-methylammonium and chloramben-sodium. Suitable salts and esters of 2,3,6-TBA include 2,3,6-TBA-dimethylammonium, 2,3,6-TBA-lithium, 2,3,6-TBA-potassium and 2,3,6-TBA-sodium.

Suitable salts and esters of aminopyralid include aminopyralid-potassium and aminopyralid-tris(2-hydroxypropyl) ammonium.

Suitable salts of glyphosate are for example glyphosate-ammonium, glyphosate-diammonium, glyphoste-dimethylammonium, glyphosate-isopropylammonium, glyphosate-potassium, glyphosate-sodium, glyphosate-trimesium as well as the ethanolamine and diethanolamine salts, preferably glyphosate-diammonium, glyphosate-isopropylammonium and glyphosate-trimesium (sulfosate).

A suitable salt of glufosinate is for example glufosinate-ammonium.

A suitable salt of glufosinate-P is for example glufosinate-P-ammonium.

Suitable salts and esters of bromoxynil are for example bromoxynil-butyrate, bromoxynil-heptanoate, bromoxynil-octanoate, bromoxynil-potassium and bromoxynil-sodium.

Suitable salts and esters of ioxonil are for example ioxonil-octanoate, ioxonil-potassium and ioxonil-sodium.

Suitable salts and esters of mecoprop include mecoprop-butotyl, mecoprop-dimethylammonium, mecoprop-diolamine, mecoprop-ethadyl, mecoprop-2-ethylhexyl, mecoprop-isoctyl, mecoprop-methyl, mecoprop-potassium, mecoprop-sodium and mecoprop-trolamine.

Suitable salts of mecoprop-P are for example mecoprop-P-butotyl, mecoprop-P-dimethylammonium, mecoprop-P-2-ethylhexyl, mecoprop-P-isobutyl, mecoprop-P-potassium and mecoprop-P-sodium.

A suitable salt of diflufenzopyr is for example diflufenzopyr-sodium.

A suitable salt of naptalam is for example naptalam-sodium.

Suitable salts and esters of aminocyclopyrachlor are for example aminocyclopyrachlor-dimethylammonium, aminocyclopyrachlor-methyl, aminocyclopyrachlor-triisopropanolammonium, aminocyclopyrachlor-sodium and aminocyclopyrachlor-potassium.

A suitable salt of quinclorac is for example quinclorac-dimethylammonium.

A suitable salt of quinmerac is for example quinclorac-dimethylammonium.

A suitable salt of imazamox is for example imazamox-ammonium.

Suitable salts of imazapic are for example imazapic-ammonium and imazapic-isopropylammonium.

Suitable salts of imazapyr are for example imazapyr-ammonium and imazapyr-isopropylammonium.

A suitable salt of imazaquin is for example imazaquin-ammonium.

Suitable salts of imazethapyr are for example imazethapyr-ammonium and imazethapyr-isopropylammonium.

A suitable salt of topramezone is for example topramezone-sodium.

In another embodiment of the methods or uses of this invention, a composition comprising a herbicidally effective amount of herbicide A (in particular (±)-2-exo-(2-Methylbenzyloxy)-1-methyl-4-isopropyl-7-oxabicyclo[2.2.1]heptane) is applied. In yet another embodiment, the composition further comprises at least one herbicide B (as defined herein).

Thus, in another embodiment of the methods or uses of this invention, a composition comprising a herbicidally effective amount of herbicide A and optionally at least one herbicide B (as defined herein) is applied. In a preferred embodiment of the methods or uses of this invention, a composition comprising a herbicidally effective amount of herbicide A and at least one herbicide B (as defined herein) is applied. In yet another embodiment of the methods or uses of this invention, a composition comprising a herbicidally effective amount of herbicide A and at least one herbicide B (as defined herein) is applied wherein the herbicide A and the herbicide B are the only active ingredients.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from inhibitors of the lipid biosynthesis (group b1 as defined herein). These are compounds that inhibit lipid biosynthesis. Inhibition of the lipid biosynthesis can be affected either through inhibition of acetylCoA carboxylase (hereinafter termed ACC herbicides) or through a different mode of action (hereinafter termed non-ACC herbicides). The ACC herbicides belong to the group A of the HRAC classification system whereas the non-ACC herbicides belong to the group N of the HRAC classification.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from ALS inhibitors (group b2 as defined herein). The herbicidal activity of these compounds is based on the inhibition of acetolactate synthase and thus on the inhibition of the branched chain amino acid biosynthesis. These inhibitors belong to the group B of the HRAC classification system.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from inhibitors of photosynthesis (group b3 as defined herein). The herbicidal activity of these compounds is based either on the inhibition of the photosystem II in plants (so-called PSII inhibitors, groups C1, C2 and C3 of HRAC classification) or on diverting the electron transfer in photosystem I in plants (so-called PSI inhibitors, group D of HRAC classification) and thus on an inhibition of photosynthesis. Amongst these, PSII inhibitors are preferred.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from inhibitors of protoporphyrinogen-IX-oxidase (group b4 as defined herein). The herbicidal activity of these compounds is based on the inhibition of the protoporphyrinogen-IX-oxidase. These inhibitors belong to the group E of the HRAC classification system.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from bleachers (group b5 as defined herein). The herbicidal activity of these compounds is based on the inhibition of the carotenoid biosynthesis. These include compounds which inhibit carotenoid biosynthesis by inhibition of phytoene desaturase (so-called PDS inhibitors, group F1 of HRAC classification), compounds that inhibit the 4-hydroxyphenylpyruvate-dioxygenase (HPPD inhibitors, group F2 of HRAC classification), compounds that inhibit DOXsynthase (group F4 of HRAC class) and compounds which inhibit carotenoid biosynthesis by an unknown mode of action (bleacher—unknown target, group F3 of HRAC classification).

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from EPSP synthase inhibitors (group b6 as defined herein). The herbicidal activity of these compounds is based on the inhibition of enolpyruvyl shikimate 3-phosphate synthase, and thus on the inhibition of the amino acid biosynthesis in plants. These inhibitors belong to the group G of the HRAC classification system.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from glutamine synthetase inhibitors (group b7 as defined herein). The herbicidal activity of these compounds is based on the inhibition of glutamine synthetase, and thus on the inhibition of the aminoacid biosynthesis in plants. These inhibitors belong to the group H of the HRAC classification system.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from DHP synthase inhibitors (group b8 as defined herein). The herbicidal activity of these compounds is based on the inhibition of 7,8-dihydropteroate synthase. These inhibitors belong to the group I of the HRAC classification system.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from mitosis inhibitors (group b9 as defined herein). The herbicidal activity of these compounds is based on the disturbance or inhibition of microtubule formation or organization, and thus on the inhibition of mitosis. These inhibitors belong to the groups K1 and K2 of the HRAC classification system. Among these, compounds of the group K1, in particular dinitroanilines, are preferred.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from VLCFA inhibitors (group b10 as defined herein). The herbicidal activity of these compounds is based on the inhibition of the synthesis of very long chain fatty acids and thus on the disturbance or inhibition of cell division in plants. These inhibitors belong to the group K3 of the HRAC classification system.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from cellulose biosynthesis inhibitors (group b11 as defined herein). The herbicidal activity of these compounds is based on the inhibition of the biosynthesis of cellulose and thus on the inhibition of the synthesis of cell walls in plants. These inhibitors belong to the group L of the HRAC classification system.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from decoupler herbicides (group b12 as defined herein). The herbicidal activity of these compounds is based on the disruption of the cell membrane. These inhibitors belong to the group M of the HRAC classification system.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from synthetic auxins (group b13 as defined herein). These include compounds that mimic auxins, i.e. plant hormones, and affect the growth of the plants. These compounds belong to the group 0 of the HRAC classification system.

In another embodiment, the composition comprises a herbicidally effective amount of herbicide A (in particular (±)-2-exo-(2-Methylbenzyloxy)-1-methyl-4-isopropyl-7-oxabicyclo[2.2.1]heptane) and at least one herbicide B selected from auxin transport inhibitors (group b14 as defined herein). The herbicidal activity of these compounds is based on the inhibition of the auxin transport in plants. These compounds belong to the group P of the HRAC classification system.

As to the given mechanisms of action and classification of the active substances, see e.g. "HRAC (Herbicide Resistance Action Committee), Classification of Herbicides According to Site of Action", http://www.hracglobal.com/pages/classificationofherbicidesiteofaction.aspx.

In another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from inhibitors of acetyl CoA carboxylase (ACCase inhibitors). Preferably, the ACCase inhibitor is selected from aryloxyphenoxypropionates, cyclohexanediones and phenylpyrazoline. More preferably, the the ACCase inhibitor is selected from the group consisting of clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-P, fluazifop-P-butyl, haloxyfop, haloxyfop-methyl, haloxyfop-P, haloxyfop-P-methyl, metamifop, propaquizafop, quizalofop, quizalofop-ethyl, quizalofop-tefuryl, quizalofop-P, quizalofop-P-ethyl, quizalofop-P-tefuryl, alloxydim, alloxydim-sodium, butroxydim, clethodim, cycloxydim, profoxydim, sethoxydim, tepraloxydim, tralkoxydim, pinoxaden, and agriculturally acceptable salts, esters or amides thereof, more preferably selected from the group consisting of clethodim, clodinafop-propargyl, cycloxydim, cyhalofop-butyl, diclofop-methyl, fenoxaprop-P-ethyl, fluazifop-P-butyl, haloxyfop-P-methyl, metamifop, pinoxaden, profoxydim, propaquizafop, quizalofop-P-ethyl, quizalofop-P-tefuryl, sethoxydim, tepraloxydim and tralkoxydim. In one embodiment, the ACCase inhibitor is selected from aryloxyphenoxypropionates, in particular selected from the group consisting of clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-P, fluazifop-P-butyl, haloxyfop, haloxyfop-methyl, haloxyfop-P, haloxyfop-P-methyl, metamifop, propaquizafop, quizalofop, quizalofop-ethyl, quizalofop-tefuryl, quizalofop-P, quizalofop-P-ethyl, and quizalofop-P-tefuryl, more preferably selected from the group consisting of clodinafop-propargyl, cyhalofop-butyl, diclofop-methyl, fenoxaprop-P-ethyl, fluazifop-P-butyl, haloxyfop-P-methyl, metamifop, propaquizafop, quizalofop-P-ethyl and quizalofop-P-tefuryl. In another embodiment, the ACCase inhibitor is selected from cyclohexanediones, in particular selected from the group consisting of alloxydim, alloxydim-sodium, butroxydim, clethodim, cycloxydim, profoxydim, sethoxydim, tepraloxydim, and tralkoxydim, more preferably selected from the group consisting of clethodim, cycoxydim, profoxydim, tepraloxydim and tralkoxydim.

In yet another embodiment, the ACCase inhibitor is pinoxaden.

In yet another embodiment, the ACCase inhibitor is selected from cyhalofop, cyhalofop-butyl, quizalofop and quizalofop-P-ethyl, more preferably from cyhalofop-butyl and quizalofop-P-ethyl.

In yet another embodiment, the ACCase inhibitor is cyhalofop or cyhalofop-butyl, in particular cyhalofop-butyl.

In yet another embodiment, the ACCase inhibitor is quizalofop or quizalofop-P-ethyl, in particular quizalofop-P-ethyl.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from sulfonylureas. Preferably, the sulfonylurea is selected from the group consisting of amidosulfuron, azimsulfuron, bensulfuron, bensulfuron-methyl, chlorimuron, chlorimuron-ethyl, chlorsulfuron, cinosulfuron, cyclosulfamuron, ethametsulfuron, ethametsulfuron-methyl, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, iodosulfuron, iodosulfuron-methyl-sodium, iofensulfuron, iofensulfuron-sodium, mesosulfuron, mesosulfuron-methyl, metazosulfuron, metsulfuron, metsulfuron-methyl, nicosulfuron, orthosulfamuron, oxasulfuron, primisulfuron, primisulfuron-methyl, propyrisulfuron, prosulfuron, pyrazosulfuron, pyrazosulfuron-ethyl, rimsulfuron, sulfometuron, sulfometuron-methyl, sulfosulfuron, thifensulfuron, thifensulfuron-methyl, triasulfuron, tribenuron, tribenuron-methyl, trifloxysulfuron, triflusulfuron, triflusulfuron-methyl, tritosulfuron and agriculturally acceptable salts, esters or amides thereof, more preferably selected from the group consisting of azimsulfuron, bensulfuron-methyl, cyclosulfamuron, ethametsulfuron-methyl, ethoxysulfuron, flupyrsulfuron-methyl-sodium, foramsulfuron, halosulfuron-methyl, iodosulfuron-methyl-sodium, mesosulfuron-methyl, nicosulfuron, pyrazosulfuron-ethyl, rimsulfuron, sulfosulfuron, tritosulfuron and agriculturally acceptable salts, esters or amides thereof.

In yet another embodiment, the sulfonylurea is metsulfuron or metsulfuron-methyl, in particular metsulfuron-methyl.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from triazolopyrimidines. Preferably, the triazolopyrimidine is selected from the group consisting of cloransulam, diclosulam, florasulam, flumetsulam, metosulam, penoxsulam, pyrimisulfan, pyroxsulam and agriculturally acceptable salts, esters or amides thereof. More preferably, the triazolopyrimidine is selected from the group consisting of cloransulam, diclosulam, florasulam, flumetsulam, metosulam, penoxsulam, pyroxsulam and agriculturally acceptable salts, esters or amides thereof, even more preferably selected from the group consisting of florasulam, penoxsulam, pyroxsulam and agriculturally acceptable salts, esters or amides thereof. In particular, the triazolopyrimidine is pyroxsulam. In another embodiment, the triazolopyrimidine is penoxsulam or pyrimisulfan.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from sulfonylaminocarbonyl-triazolinones. Preferably, the sulfonylaminocarbonyl-triazolinone is selected from the group consisting of flucarbazone, propoxycarbazone, thiencarbazone and agriculturally acceptable salts, esters or amides thereof.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from pyrimidinylbenzoates. Preferably, the pyrimidinylbenzoate is selected from the group consisting of bispyribac, pyribenzoxim, pyriftalid, pyriminobac, pyrithiobac, 4-[[[2-[(4,6-dimethoxy-2-pyrimidinyl)oxy]phenyl]methyl]amino]-benzoic acid-1-methylethyl ester (CAS 420138-41-6), 4-[[[2-[(4,6-dimethoxy-2-pyrimidinyl)oxy]phenyl]methyl]amino]-benzoic acid propyl ester (CAS 420138-40-5), N-(4-bromophenyl)-2-[(4,6-dimethoxy-2-pyrimidinyl)oxy] benzenemethanamine (CAS 420138-01-8), and agriculturally acceptable salts, esters or amides thereof. More preferably, the pyrimidinylbenzoate is selected from the group consisting of bispyribac, pyribenzoxim, pyriftalid, pyriminobac, and agriculturally acceptable salts, esters or amides thereof. In particular, the pyrimidinylbenzoate is selected from the group consisting of bispyribac, bispyribac-sodium, pyribenzoxim, pyriftalid, pyriminobac and pyriminobac-methyl.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from inhibitors of the photosystem II. Preferably, the inhibitor of the photosystem II is bentazone, propanil or an agriculturally acceptable salt, ester or amide thereof. In one embodiment, the inhibitor of the photosystem II is bentazone-sodium. In another embodiment, the inhibitor of the photosystem II is propanil.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from inhibitors of protoporphyrinogen-IX oxidase. Preferably, the protoporphyrinogen-IX oxidase inhibitors is selected from bifenox and oxadiazon.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from inhibitors of microtubule assembly (HRAC group K1). Preferably, the microtubule assembly inhibitor is selected from butralin and dithiopyr.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from inhibitors of VLCFA. Preferably, the VLCFA inhibitor is selected from fentrazamide, ipfencarbazone, cafenstrole, fenoxasulfone, and agriculturally acceptable salts, esters or amides thereof. In another embodiment, the VLCFA inhibitor is piperophos.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from the group of the bleacher herbicides. Preferably, the bleacher herbicide is aclonifen.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from HPPD inhibitors. Preferably, the HPPD inhibitor is selected from benzobicyclon, benzofenap, bicyclopyrone, fenquintrione, isoxaflutole, isoxachlortole, mesotrione, pyrasulfotole, pyrazolynate, pyrazoxyfen, sulcotrione, tefuryltrione, tembotrione, tolpyralate, topramezone, and agriculturally acceptable salts, esters or amides thereof. More preferably, the HPPD inhibitor is selected from benzobicyclon, benzofenap, isoxachlortole, pyrazolynate, pyrazoxyfen, tefuryltrione, and agriculturally acceptable salts, esters or amides thereof.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from the group of cellulose biosynthesis inhibitors, preferably indaziflam.

In still yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from synthetic auxins. Preferably, the synthetic auxin is selected from phenoxycarboxylic acids, benzoic acids, pyridinecarboxylic acids and benazolin-ethyl. More preferably, the synthetic auxin is selected from the group consisting of 2,4-D, 3,4-DA, MCPA, 2,4,5-T, 2,4-DP (dichlorprop), 2,4-DP-P, 4-CPP, 3,4-DP, fenoprop, CMPP (mecoprop), CMPP-P, 4-CPB, 2,4-DB, 3,4-DB, 2,4,5-TB, MCPB, dicamba, tricamba, chloramben, 2,3,6-TBA (2,3,6-trichlorobenzoic acid), aminopyralid, clopyralid, fluoroxypyr, picloram, triclopyr, halauxifen, 4-amino-3-chloro-6-(4-chloro-2-fluoro-3-methoxyphenyl)-5-fluoropyridine-2-carboxylic acid, benzyl 4-amino-3-chloro-6-(4-chloro-2-fluoro-3-methoxyphenyl)-5-fluoropyridine-2-carboxylate (CAS 1390661-72-9), benazolin-ethyl, and agriculturally acceptable salts, esters or amides thereof. In another embodiment, the synthetic auxin is selected from phenoxycarboxylic acids, in particular selected from the group consisting of 2,4-D, 3,4-DA, MCPA, 2,4,5-T, 2,4-DP (dichlorprop), 2,4-DP-P, 4-CPP, 3,4-DP, fenoprop, CMPP (mecoprop), CMPP-P, 4-CPB, 2,4-DB, 3,4-DB, 2,4,5-TB, MCPB, and agriculturally acceptable salts, esters or amides thereof. In another embodiment, the synthetic auxin is selected from benzoic acids, in particular selected from the group consisting of dicamba, tricamba, chloramben, 2,3,6-TBA (2,3,6-trichlorobenzoic acid), and agriculturally acceptable salts, esters or amides thereof. In another embodiment, the synthetic auxin is selected from pyridinecarboxylic acids, in particular selected from the group consisting of aminopyralid, clopyralid, fluoroxypyr, picloram, triclopyr, halauxifen, 4-amino-3-chloro-6-(4-chloro-2-fluoro-3-methoxyphenyl)-5-fluoropyridine-2-carboxylic acid, benzyl 4-amino-3-chloro-6-(4-chloro-2-fluoro-3-methoxyphenyl)-5-fluoropyridine-2-carboxylate (CAS 1390661-72-9), and agriculturally acceptable salts, esters or amides thereof. In yet another embodiment, the synthetic auxin is benazolin-ethyl. In still another embodiment, the synthetic auxin is benzyl 4-amino-3-chloro-6-(4-chloro-2-fluoro-3-methoxyphenyl)-5-fluoropyridine-2-carboxylate (CAS 1390661-72-9).

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from the group of herbicides with unknown mode of action (HRAC group Z), preferably selected from indanofan, methiozolin (CAS 403640-27-7), oxaziclomefone, and agriculturally acceptable salts, esters or amides thereof and more preferably indanofan.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from the groups
 b1) lipid biosynthesis inhibitors: cyhalofop, quizalofop,
 b2) ALS inhibitors: metsulfuron, penoxsulam, pyrimisulfan, bispyribac, pyribenzoxim, pyriftalid, pyriminobac,
 b3) photosynthesis inhibitors: propanil,
 b5) bleacher herbicides: benzobicyclon, benzofenap, isoxachlortole, pyrazolynate, pyrazoxyfen, tefuryltrione,
 b10) VLCFA inhibitors: fentrazamide, ipfencarbazone, cafenstrole, fenoxasulfone,
 b13) synthetic auxins: benzyl 4-amino-3-chloro-6-(4-chloro-2-fluoro-3-methoxyphenyl)-5-fluoropyridine-2-carboxylate (CAS 1390661-72-9),
 b15) other herbicides: indanofan, methiozolin (CAS 403640-27-7), oxaziclomefone,
 and agriculturally acceptable salts, esters or amides thereof.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from the groups
 b1) lipid biosynthesis inhibitors: cyhalofop, cyhalofop-butyl, quizalofop, and quizalofop-P-ethyl,
 b2) ALS inhibitors: metsulfuron, metsulfuron-methyl, bispyribac, and bispyribac-sodium.

In yet another aspect of the present invention, there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one herbicide B selected from the groups
 b1) lipid biosynthesis inhibitors: cyhalofop-butyl and quizalofop-P-ethyl,
 b2) ALS inhibitors: metsulfuron-methyl and bispyribac-sodium.

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) cyhalofop or cyhalofop-butyl (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) quizalofop or quizalofop-P-ethyl (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) metsulfuron or metsulfuron-methyl (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) penoxsulam (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) pyrimisulfan (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) bispyribac or bispyribac-sodium (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) pyribenzoxim (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) pyriftalid (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) pyriminobac or pyriminobac-methyl (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) propanil (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) benzobicyclon (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) benzofenap (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) isoxachlortole (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) pyrazolynate (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) pyrazoxyfen (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) tefuryltrione (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) fentrazamide (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) ipfencarbazone (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) cafenstrole (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) fenoxasulfone (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) benzyl 4-amino-3-chloro-6-(4-chloro-2-fluoro-3-methoxyphenyl)-5-fluoropyridine-2-carboxylate (CAS 1390661-72-9) (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) indanofan (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) methiozolin (CAS 403640-27-7) (herbicide B).

In yet another aspect of the present invention, there is provided a herbicidal composition herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) oxaziclomefone (herbicide B).

In another aspect, the present invention relates to the use of the composition as defined herein (in particular any one of the aforementioned herbicidal compositions comprising herbicide A and the specific herbicides B of groups b1, b2, b3, b5, b10, b13 and b15) for controlling undesirable vegetation.

In another aspect, the present invention relates to a method for controlling undesirable vegetation which comprises applying to the vegetation or the locus thereof or applying to the soil or water to prevent the emergence or growth of the undesirable vegetation the composition as defined herein (in particular any one of the aforementioned herbicidal compositions comprising herbicide A and the specific herbicides B of groups b1, b2, b3, b5, b10, b13 and b15).

The aforementioned herbicidal compositions comprising herbicide A and the specific herbicides B of groups b1, b2, b3, b5, b10, b13 and b15 are particularly suitable for selective weed control in rice crops (including but not limited to transplanted rice).

Thus, in another aspect, the present invention relates to the use of any one of the aforementioned compositions for selectively controlling undesirable vegetation in rice crops (including but not limited to transplanted rice).

In yet another aspect, the present invention relates to a method for selectively controlling undesirable vegetation in rice crops (including but not limited to transplanted rice) which comprises applying to the rice crop area any one of the aforementioned compositions.

In the aforementioned uses or methods, the undesirable vegetation is preferably selected from the genera *Agropyron, Alopecurus, Apera, Avena, Brachiaria, Bromus, Cynodon, Digitaria, Echinochloa, Eleusine, Ischaemum, Leptochloa, Lolium, Panicum, Phalaris, Poa, Rottboellia, Setaria, Anthemis, Amaranthus, Ambrosia, Capsella, Centaurea, Chenopodium, Conyza, Descurainia, Galium, Kochia, Matricaria, Papaver, Raphanus, Sinapis, Sisymbrium, Stellaria* and *Thlaspi*.

More preferably, the undesirable vegetation is selected from the genera *Alopecurus, Apera, Digitaria, Echinochloa, Leptochloa, Lolium, Phalaris, Poa, Setaria, Amaranthus, Anthemis, Capsella, Centaurea, Chenopodium, Descurania, Kochia, Matricaria, Papaver, Sisymbrium, Stellaria* and *Thlaspi*, more preferably selected from the genera *Alopecurus, Apera, Echinochloa, Leptochloa, Lolium, Phalaris, Poa, Amaranthus, Chenopodium, Matricaria, Papaver* and *Stellaria*, even more preferably selected from the genera *Alopecurus, Echinochloa, Lolium, Phalaris, Poa, Amaranthus, Chenopodium, Matricaria, Papaver* and *Stellaria*, yet more preferably selected from the genera *Alopecurus, Echinochloa, Lolium, Phalaris, Poa* and *Papaver* and in particular selected from the genera *Alopecurus, Lolium, Phalaris* and *Papaver*.

In another embodiment, the undesirable vegetation is selected from the genera *Alopecurus, Bromus, Brassica, Galium, Lolium, Matricaria* and *Papaver*.

In particular, the undesirable vegetation is selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata, Setaria viridis, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisifolia, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Kochia scoparia, Matricaria chamomilla, Matricaria discoidea, Matricaria inodora, Papaver rhoeas, Raphanus raphanistrum, Sinapis alba, Sinapis arvensis, Sisymbrium officinale, Sisymbrium orientale, Stellaria media* and *Thlaspi arvense*, preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Poa trivialis, Setaria faberi, Setaria glauca, Setaria pumila, Setaria verticillata, Setaria viridis, Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Kochia scoparia, Matricaria chamomilla, Matricaria inodora, Papaver rhoeas, Sisymbrium officinale, Stellaria media* and *Thlaspi arvense*, more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Amaranthus powellii, Amaranthus retroflexus, Amaranthus tuberculatus, Amaranthus rudis, Chenopodium album, Matricaria chamomilla, Matricaria inodora, Papaver rhoeas* and *Stellaria media*, especially preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum, Phalaris minor* and *Poa annua*, and in particular selected from the group consisting of *Alopecurus myosuroides, Lolium multiflorum, Lolium rigidum* and *Phalaris minor*.

In another embodiment, the undesirable vegetation is selected from *Alopecurus myosuroides, Bromus sterilis, Brassica napus, Galium aparine, Lolium rigidum, Matricaria inodora* and *Papaver rhoeas*.

In another embodiment, the compositions as defined herein may further comprise at least one safener C (as defined herein). In yet another embodiment, these compositions may further comprise one or more auxiliaries customary in crop protection (as defined herein).

Certain combinations of (a) herbicide A and (b) herbicide B may also be capable of providing a synergistic herbicidal effect.

Thus, in a preferred embodiment of the compositions, uses and methods of this invention, the herbicide A and herbicide B are each present or applied in an amount sufficient to provide a synergistic herbicidal effect.

The term "synergistic herbicidal effect" refers to the herbicidal effect for a given combination of two herbicides where the herbicidal activity of the combination exceeds the total of the individual herbicidal activities of the herbicides when applied separately. For this reason, the compositions can, based on the individual components, be used at lower application rates to achieve a herbicidal effect comparable to the individual components.

In some embodiments of this invention, Colby's equation is applied to determine whether the combination of herbicide A and herbicide B shows a synergistic effect (see S. R. Colby, "Calculating synergistic and antagonistic responses of herbicide combinations", Weeds 1967, 15, pp. 20-22).

$$E=X+Y-(X \cdot Y/100)$$

where X=effect in percent using herbicide A at an application rate a;
Y=effect in percent using herbicide B at application rate b;
E=expected effect (in %) of herbicide A+herbicide B at application rates a+b.

In Colby's equation, the value E corresponds to the effect (plant damage or injury) which is to be expected if the activity of the individual compounds is additive. If the observed effect is higher than the value E calculated according to the Colby equation, a synergistic effect is present.

In one embodiment of the present invention, the methods, uses and compositions disclosed herein are synergistic as determined by the Colby equation. Specifically, the synergistic herbicidal effect is determined according to the Colby equation.

In the methods, uses and compositions of the invention, the weight ratio of herbicide A (in particular (±)-2-exo-(2-Methylbenzyloxy)-1-methyl-4-isopropyl-7-oxabicyclo[2.2.1]heptane) to herbicide B is generally in the range of from 1:1000 to 1000:1, preferably in the range of from 1:500 to 500:1, in particular in the range of from 1:250 to 250:1 and particularly preferably in the range of from 1:75 to 75:1, wherein each herbicide B being an ester or a salt of an acid is calculated as the acid.

In the methods, uses and compositions of the invention, the weight ratio of herbicide A (in particular (±)-2-exo-(2-Methylbenzyloxy)-1-methyl-4-isopropyl-7-oxabicyclo[2.2.1]heptane) to safener C is generally in the range of from 1:1000 to 1000:1, preferably in the range of from 1:500 to 500:1, in particular in the range of from 1:250 to 250:1 and particularly preferably in the range of from 1:75 to 75:1, wherein each safener C being an ester or a salt of an acid is calculated as the acid.

In the methods, uses and compositions of the invention, the weight ratio of herbicide B to safener C is generally in the range of from 1:1000 to 1000:1, preferably in the range of from 1:500 to 500:1, in particular in the range of from 1:250 to 250:1 and particularly preferably in the range of from 1:75 to 75:1, wherein each herbicide B and safener C being an ester or a salt of an acid is calculated as the acid.

In the methods, uses and compositions of the invention, the weight ratio of the combination of herbicides A (in particular (±)-2-exo-(2-Methylbenzyloxy)-1-methyl-4-isopropyl-7-oxabicyclo[2.2.1]heptane) and B to the safener C is preferably in the range of from 1:500 to 500:1, in particular in the range of from 1:250 to 250:1 and particularly preferably in the range of from 1:75 to 75:1, wherein each herbicide B and safener C being an ester or a salt of an acid is calculated as the acid.

The compositions as defined herein are suitable as herbicides as such or as appropriately formulated agrochemical compositions. As used herein, the term "agrochemical composition" refers to a composition further comprising one or more auxiliaries customary in crop protection.

Thus, the agrochemical composition comprises a herbicidally effective amount of herbicide A, optionally at least one herbicide B (as defined herein), optionally at least one safener C (as defined herein) and one or more auxiliaries customary in crop protection.

The herbicide A, optionally at least one herbicide B (as defined herein) and optionally at least one safener C (as defined herein) can be converted into customary types of agrochemical compositions, e. g. solutions, emulsions, suspensions, dusts, powders, pastes, granules, pressings, and mixtures thereof. These and further types of agrochemical compositions are defined in the "Catalogue of pesticide formulation types and international coding system", Technical Monograph No. 2, $6^{th}$ Ed. May 2008, CropLife International.

The agrochemical compositions can be prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

The term "auxiliaries customary in crop protection" includes but is not limited to solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B—C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compound I on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

The agrochemical compositions generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Various types of oils, wetters, adjuvants, fertilizer, or micronutrients, and further pesticides (e.g. herbicides, insecticides, fungicides, growth regulators, safeners) may be added to the active substances or the compositions comprising them as premix or, if appropriate not until immediately prior to use (tank mix). These agents can be admixed with the compositions as defined herein in a weight ratio of 1:100 to 100:1, preferably 1:10 to 10:1.

The user applies the agrochemical composition usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition is thus obtained. Usually, 20 to 2000 liters, preferably 50 to 400 liters, of the ready-to-use spray liquor are applied per hectare of useful agricultural area.

According to one embodiment, either individual components of the agrochemical composition or partially premixed components, e. g. agrochemical components comprising herbicide A, optionally at least one herbicide B (as defined herein) and optionally at least one safener C (as defined herein) may be mixed by the user in a spray tank and further auxiliaries and additives may be added, if appropriate.

In another embodiment, individual components of the agrochemical composition such as parts of a kit or parts of a binary or ternary mixture may be mixed by the user himself in a spray tank and further auxiliaries may be added, if appropriate.

In another embodiment, either individual components of the agrochemical composition or partially premixed components, e. g. components comprising herbicide A, optionally at least one herbicide B (as defined herein) and optionally at least one safener C (as defined herein) can be applied jointly (e.g. after tank mixing) or consecutively.

Accordingly, the agrochemical composition may be provided in the form of a single package formulation comprising herbicide A, optionally at least one herbicide B (as defined herein) and optionally at least one safener C (as defined herein) together with liquid and/or solid carriers, and, if desired, one or more surfactants and, if desired, one or more further auxiliaries customary in crop protection. The formulation may be provided in the form of a two package formulation, wherein one package comprises a formulation of herbicide A while the other package comprises a formulation comprising at least one herbicide B and/or safener C, and wherein both formulations comprise at least one carrier material, if desired, one or more surfactants and, if desired, one or more further auxiliaries customary in crop protection. The formulation may also be provided in the form of a two package formulation, wherein one package comprises a formulation of herbicide A and optionally the safener C, while the other package comprises a formulation of the at least one herbicide B, and wherein both formulations comprises at least one carrier material, if desired, one or more surfactants and, if desired, one or more further auxiliaries customary in crop protection. In the case of two package formulations the two formulations are preferably mixed prior to application. Preferably the mixing is performed as a tank mix, i.e. the formulations are mixed immediately prior or upon dilution with water.

The compositions as defined herein control vegetation on non-crop areas very efficiently, especially at high rates of application. They act against broad-leafed weeds and grass weeds in crops such as wheat, barley, rice, corn, sunflowers, soybeans and cotton without causing any significant damage to the crop plants. This effect is mainly observed at low rates of application.

The compositions as defined herein are applied to the plants mainly by spraying. Here, the application can be carried out using, for example, water as carrier by customary spraying techniques using spray liquor amounts of from about 50 to 1000 l/ha (for example from 300 to 400 l/ha). The compositions as defined herein may also be applied by the low-volume or the ultra-low-volume method, or in the form of microgranules.

The compositions as defined herein can be applied pre- or post-emergence or together with the seed of a crop plant. It is also possible to apply the compounds and compositions by applying seed, pretreated with a composition as defined herein, of a crop plant. If the herbicide A and, if appropriate, the herbicide B are less well tolerated by certain crop plants, application techniques may be used in which the herbicidal compositions are sprayed, with the aid of the spraying equipment, in such a way that as far as possible they do not come into contact with the leaves of the sensitive crop plants, while the active compounds reach the leaves of undesirable plants growing underneath, or the bare soil surface (post-directed, lay-by).

In a further embodiment, the compositions as defined herein can be applied by treating seed. The treatment of seed comprises essentially all procedures familiar to the person skilled in the art (seed dressing, seed coating, seed dusting, seed soaking, seed film coating, seed multilayer coating, seed encrusting, seed dripping and seed pelleting) based on the compositions as defined herein. Here, the compositions as defined herein can be applied diluted or undiluted. The term "seed" comprises seed of all types, such as, for example, corns, seeds, fruits, tubers, seedlings and similar forms. Here, preferably, the term seed describes corns and seeds. The seed used can be the seed of the useful plants mentioned above, but also the seed of transgenic plants or plants obtained by customary breeding methods.

Moreover, it may be advantageous to apply the compositions as defined herein on their own or jointly in combination with other crop protection agents, for example with agents for controlling pests or phytopathogenic fungi or bacteria or with groups of active compounds which regulate growth. Also of interest is the miscibility with mineral salt solutions which are employed for treating nutritional and trace element deficiencies. Non-phytotoxic oils and oil concentrates can also be added.

When employed in plant protection, the amounts of active substances applied (i.e. herbicide A and, if appropriate, herbicide B) without formulation auxiliaries, are, depending on the kind of effect desired, 0.0001 to 10 kg per hectare (kg/ha), preferably 0.001 to 3 kg/ha, more preferably from 0.001 to 2.5 kg/ha, even more preferably from 0.001 to 2 kg/ha, especially preferably from 0.005 to 2 kg/ha, in particular from 0.05 to 0.9 kg/ha and most preferably from 0.1 to 0.75 kg/ha.

In the methods and uses of this invention, the herbicide A (in particular (±)-2-exo-(2-Methylbenzyloxy)-1-methyl-4-isopropyl-7-oxabicyclo[2.2.1]heptane) is generally applied in an amount of from 0.1 to 2000 grams per hectare (g/ha), preferably 10 to 1000 g/ha, more preferably 10 to 750 g/ha and in particular 10 to 500 g/ha. In another embodiment, the herbicide A (in particular (±)-2-exo-(2-Methylbenzyloxy)-1-methyl-4-isopropyl-7-oxabicyclo[2.2.1]heptane) is applied in an amount of from 50 to 1000 g/ha, preferably 75 to 750 g/ha and more preferably 100 to 500 g/ha.

In the methods and uses of this invention, the application rate of the herbicide B (in case of salts calculated as the acid) is generally from 0.0005 kg/ha to 10 kg/ha, preferably from 0.005 kg/ha to 5 kg/ha and more preferably from 0.001 kg/ha to 2 kg/ha.

In the methods and uses of this invention, the application rate of the safener C (in case of salts calculated as the acid) is generally from 0.0005 kg/ha to 2.5 kg/ha, preferably from 0.005 kg/ha to 2 kg/ha and more preferably from 0.01 kg/ha to 1.5 kg/ha.

In treatment of plant propagation materials such as seeds, e. g. by dusting, coating or drenching seed, amounts of active substance (i.e. herbicide A and, if appropriate, herbicide B) of from 0.1 to 5000 g, preferably from 5 to 2500 g, more preferably from 50 to 2000 g and in particular from 100 to 1500 g, per 100 kilogram of plant propagation material (preferably seeds) are generally required.

In another embodiment of the invention, to treat the seed, the amounts of active substances applied (i.e. herbicide A and, if appropriate, herbicide B) are generally employed in amounts of from 0.001 to 10 kg per 100 kg of seed.

In the methods and uses of the invention, the herbicide A and, if present, the herbicide B and/or the safener C can be applied jointly or separately.

In the methods and uses of the invention, the herbicide A and, if present, the herbicide B and/or the safener C can be applied simultaneously or in succession.

Preferably, the herbicide A and, if present, the herbicide B and/or the safener C are applied simultaneously to the undesirable vegetation. In another embodiment, the herbicide A and, if present, the herbicide B and/or the safener C are provided as herbicidal composition as defined herein (e.g. a tank mixture containing the herbicide A and, if present, the herbicide B and/or the safener C) being applied to the undesirable vegetation. Thus, in some embodiments of the method of this invention, the herbicidal composition as defined herein is applied to the undesirable vegetation or the locus thereof with or applied to the soil or water to prevent the emergence or growth of the undesirable vegetation.

In case of separate or successive application, the order of the application of the herbicide A and, if present, the herbicide B and/or the safener C is of minor importance. It is only necessary that the herbicide A and, if present, the herbicide B and/or the safener C are applied in a time frame that allows simultaneous action of the active ingredients on the plants to be controlled and/or safened, preferably within a time frame of at most 14 days, in particular at most 7 days.

In the methods and uses of the invention, the herbicide A and, if present, the herbicide B and/or the safener C (or the composition as defined herein) can be applied pre-emergence (i.e. before the emergence of undesirable vegetation) or post-emergence (i.e., during and/or after emergence of the undesirable vegetation).

Preferably, the herbicide A and, if present, the herbicide B and/or the safener C (or the composition as defined herein) are/is applied before the emergence of the undesirable vegetation (pre-emergence).

More preferably, the herbicide A and, if present, the herbicide B and/or the safener C (or the composition as defined herein) are/is applied before or during the emergence of the undesirable vegetation (pre-emergence or early-post emergence).

In another embodiment, the herbicide A and, if present, the herbicide B and/or the safener C (or the composition as defined herein) are/is applied after emergence of the undesirable vegetation.

In case of post-emergence treatment, the herbicide A and, if present, the herbicide B and/or the safener C (or the composition as defined herein) are/is preferably applied after the undesirable vegetation has emerged and has developed up to 6 leaves.

The methods, uses and compositions according to the invention are suitable for controlling undesirable vegetation in various crop plants. Examples of suitable crops are the following: *Allium cepa* (onions), *Allium sativum* (garlic), *Ananas comosus* (pineapples), *Arachis hypogaea* [peanuts (groundnuts)], *Asparagus officinalis* (asparagus), *Avena sativa* (oat), *Beta vulgaris* spec. *altissima* (sugar beet), *Beta vulgaris* spec. *rapa* (turnips), *Brassica napus* var. *napus* (rapeseed, canola), *Brassica napus* var. *napobrassica* (swedes), *Brassica rapa* var. *silvestris* (winter turnip rape), *Brassica oleracea* (cabbage), *Brassica nigra* (black mustard), *Camellia sinensis* (tea plants), *Carthamus tinctorius* (safflower), *Carya illinoinensis* (pecan trees), *Citrus limon* (lemons), *Citrus sinensis* (orange trees), *Coffea arabica* (*Coffea canephora*, *Coffea liberica*) (coffee plants), *Cucumis sativus* (cucumber), *Cynodon dactylon* (Bermudagrass), *Daucus carota* subspec. *sativa* (carrot), *Elaeis guineensis* (oil palms), *Fragaria vesca* (strawberries), *Glycine max* (soybeans), *Gossypium hirsutum* (*Gossypium arboreum*, *Gossypium herbaceum*, *Gossypium vitifolium*), *Helianthus annuus* (sunflowers), *Hevea brasiliensis* (rubber plants), *Hordeum vulgare* (barley), *Humulus lupulus* (hops), *Ipomoea batatas* (sweet potatoes), *Juglans regia* (walnut trees), *Lens culinaris* (lentil), *Linum usitatissimum* (flax), *Lycopersicon lycopersicum* (tomatoes), *Malus* spec. (apple trees), *Manihot esculenta* (cassava), *Medicago sativa* [alfalfa (lucerne)], *Musa* spec. (banana plants), *Nicotiana tabacum* (*N. rustica*) (tobacco), *Olea europaea* (olive trees), *Oryza sativa* (rice), *Phaseolus lunatus* (limabeans), *Phaseolus vulgaris* (snapbeans, green beans, dry beans), *Picea abies* (Norway spruce), *Pinus* spec. (pine trees), *Pistacia vera* (pistachio), *Pisum sativum* (English peas), *Prunus avium* (cherry trees), *Prunus persica* (peach trees), *Pyrus communis* (pear trees), *Prunus armeniaca* (apricot), *Prunus cerasus* (sour cherry), *Prunus dulcis* (almond trees) and *prunus domestica* (plum trees), *Ribes sylvestre* (redcurrants), *Ricinus communis* (castor-oil plants), *Saccharum officinarum* (sugar cane), *Secale cereale* (rye), *Sinapis alba*, *Solanum tuberosum* (Irish potatoes), *Sorghum bicolor* (s. *vulgare*) (sorghum), *Theobroma cacao* (cacao plants), *Trifolium pratense* (red clover), *Triticum aestivum* (wheat), *Triticale* (triticale), *Triticum durum* (durum wheat, hard wheat), *Vicia faba* (tick beans), *Vitis vinifera* (grapes), *Zea mays* (Indian corn, sweet corn, maize).

Preferred crops are *Allium cepa, Allium sativum, Arachis hypogaea, Avena sativa, Beta vulgaris* spec. *altissima, Brassica napus* var. *napus, Brassica oleracea, Cynodon dactylon, Daucus carota* subspec. *Sativa, Glycine max, Gossypium hirsutum,* (*Gossypium arboreum, Gossypium herbaceum, Gossypium vitifolium*), *Helianthus annuus, Hordeum vulgare, Lens culinaris, Linum usitatissimum, Lycopersicon lycopersicum, Malus* spec., *Medicago sativa, Oryza sativa, Phaseolus lunatus, Phaseolus vulgaris, Pisum sativum, Saccharum officinarum, Secale cereale, Solanum tuberosum, Sorghum bicolor* (s. *vulgare*), *Triticale, Triticum aestivum, Triticum durum, Vicia faba, Vitis vinifera* and *Zea mays*.

In another embodiment, the crop plant is selected from wheat, barley, rye, oat, *triticale*, corn (maize), sunflower, rice, legume crops (like soybeans, peas, beans such as *Vicia*-beans, *Phaseolus*-beans or *Vigna*-beans, peanuts, chickpeas, lentils, alfalfa, lupins etc.), oilseed rape, canola, cotton, potato, sugarbeet, sugarcane, bulb vegetables (like onion, garlic, shallot, etc), carrot, tomato, *brassica* vegetable (like cabbage, cauliflower, broccoli, brussel sprouts, curly kale, kohlrabi, etc), leaf vegetable (like salad, lettuce, endive, radicchio, rucola, chicory, etc.), bell pepper, cucumber, eggplant, pumpkin, melon, pepper, zucchini, parsley, parsnip, radish, horseradish, leek, *asparagus*, celery, artichoke, tobacco, hop, *citrus* fruits (like orange, lemon, limon, pomelo, grapefruit, mandarin, nectarines, etc.), stonefruits (like apricot, cherry, peach, plum, etc.), pomefruits (like apple, pear, quince, etc), nuts (like almond, walnut, etc), grape, oilpalm, olives, and turfgrasses (like bahiagrass, bentgrass, bermudagrass, bluegrass, buffalograss, carpetgrass, centipedegrass, fescues, kikuyugrass, ryegrass, St. Augustinegrass, zoysiagrass).

In a preferred embodiment, the crop plant is selected from the group consisting of wheat, barley, rye, *triticale*, oat, corn (maize), sunflower, rice, soybeans, peas, beans, peanuts, oilseed rape, canola, cotton, potato, sugarbeet, sugarcane, turfgrasses and vegetables.

In an even more preferred embodiment, the crop plant is selected from the group consisting of wheat, barley, rye, *triticale*, oat, corn (maize), sunflower, rice, soybeans, peas, *Vicia*-beans, *Phaseolus*-beans, peanuts, oilseed rape, canola, cotton, potato, sugarbeet, sugarcane, turfgrasses and vegetables.

In an especially preferred embodiment, the undesirable vegetation is controlled in cereals. In particular, the cereals are selected from the group consisting of wheat, barley, rye, oat, and *triticale*.

In another especially preferred embodiment, the undesirable vegetation is controlled in rice (including but not limited to transplanted rice).

The methods, uses and compositions according to the invention can also be used in genetically modified plants. The term "genetically modified plants" is to be understood as plants whose genetic material has been modified by the use of recombinant DNA techniques to include an inserted sequence of DNA that is not native to that plant species' genome or to exhibit a deletion of DNA that was native to that species' genome, wherein the modification(s) cannot readily be obtained by cross breeding, mutagenesis or natural recombination alone. Often, a particular genetically modified plant will be one that has obtained its genetic modification(s) by inheritance through a natural breeding or propagation process from an ancestral plant whose genome was the one directly treated by use of a recombinant DNA technique. Typically, one or more genes have been integrated into the genetic material of a genetically modified plant in order to improve certain properties of the plant. Such genetic modifications also include but are not limited to targeted post-translational modification of protein(s), oligo- or polypeptides. e. g., by inclusion therein of amino acid mutation(s) that permit, decrease, or promote glycosylation or polymer additions such as prenylation, acetylation farnesylation, or PEG moiety attachment.

Plants that have been modified by breeding, mutagenesis or genetic engineering, e.g. have been rendered tolerant to applications of specific classes of herbicides, such as auxin herbicides such as dicamba or 2,4-D; bleacher herbicides such as 4-hydroxyphenylpyruvate dioxygenase (HPPD) inhibitors or phytoene desaturase (PDS) inhibitors; acetolactate synthase (ALS) inhibitors such as sulfonylureas or imidazolinones; enolpyruvyl shikimate 3-phosphate synthase (EPSP) inhibitors such as glyphosate; glutamine synthetase (GS) inhibitors such as glufosinate; protoporphyrinogen-IX oxidase inhibitors; lipid biosynthesis inhibitors such as acetylCoA carboxylase (ACCase) inhibitors; or oxynil (i. e. bromoxynil or ioxynil) herbicides as a result of conventional methods of breeding or genetic engineering; furthermore, plants have been made resistant to multiple classes of herbicides through multiple genetic modifications, such as resistance to both glyphosate and glufosinate or to both glyphosate and a herbicide from another class such as ALS inhibitors, HPPD inhibitors, auxin herbicides, or ACCase inhibitors. These herbicide resistance technologies are, for example, described in Pest Management Science 61, 2005, 246; 61, 2005, 258; 61, 2005, 277; 61, 2005, 269; 61, 2005, 286; 64, 2008, 326; 64, 2008, 332; Weed Science 57, 2009, 108; Australian Journal of Agricultural Research 58, 2007, 708; Science 316, 2007, 1185; and references quoted therein. Several cultivated plants have been rendered tolerant to herbicides by mutgenesis and conventional methods of breeding, e. g., Clearfield® summer rape (Canola, BASF SE, Germany) being tolerant to imidazolinones, e. g., imazamox, or ExpressSun® sunflowers (DuPont, USA) being tolerant to sulfonyl ureas, e. g., tribenuron. Genetic engineering methods have been used to render cultivated plants such as soybean, cotton, corn, beets and rape, tolerant to herbicides such as glyphosate, imidazolinones and glufosinate, some of which are under development or commercially available under the brands or trade names RoundupReady® (glyphosate tolerant, Monsanto, USA), Cultivance® (imidazolinone tolerant, BASF SE, Germany) and LibertyLink® (glufosinate tolerant, Bayer CropScience, Germany).

Furthermore, plants are also covered that are by the use of recombinant DNA techniques capable to synthesize one or more insecticidal proteins, especially those known from the bacterial genus *Bacillus*, particularly from *Bacillus thuringiensis*, such as delta-endotoxins, e. g., CryIA(b), CryIA(c), CryIF, CryIF(a2), CryIIA(b), CryIIIA, CryIIIB(b1) or Cry9c; vegetative insecticidal proteins (VIP), e. g., VIP1, VIP2, VIP3 or VIP3A; insecticidal proteins of bacteria colonizing nematodes, e. g., *Photorhabdus* spp. or *Xenorhabdus* spp.; toxins produced by animals, such as scorpion toxins, arachnid toxins, wasp toxins, or other insect-specific neurotoxins; toxins produced by fungi, such as Streptomycetes toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxy-steroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; diuretic hormone receptors (helicokinin receptors); stilbene synthase, bibenzyl synthase, chitinases or glucanases. In the context of the present invention these insecticidal proteins or toxins are to be understood expressly also as including pre-toxins, hybrid proteins, truncated or otherwise modified proteins. Hybrid proteins are characterized by a new combination of protein domains, (see, e. g., WO 02/015701). Further examples of such toxins or genetically modified plants capable of synthesizing such toxins are disclosed, e. g., in EP-A 374 753, WO 93/007278, WO 95/34656, EP-A 427 529, EP-A 451 878, WO 03/18810 and WO 03/52073. The methods for producing such genetically modified plants are generally known to the person skilled in the art and are described, e. g., in the publications mentioned above. These insecticidal proteins contained in the genetically modified plants impart to the plants producing these proteins tolerance to harmful pests from all taxonomic groups of arthropods, especially to beetles (Coleoptera), two-winged insects (Diptera), and moths (Lepidoptera) and to nematodes (Nematoda). Genetically modified plants capable to synthesize one or more insecticidal proteins are, e. g., described in the publications mentioned above, and some of which are commercially available such as YieldGard® (corn cultivars producing the Cry1Ab toxin), YieldGard® Plus (corn cultivars producing Cry1Ab and Cry3Bb1 toxins), Starlink® (corn cultivars producing the Cry9c toxin), Herculex® RW (corn cultivars producing Cry34Ab1, Cry35Ab1 and the enzyme Phosphinothricin-N-Acetyltransferase [PAT]); NuCOTN® 33B (cotton cultivars producing the Cry1Ac toxin), Bollgard® I (cotton cultivars producing the Cry1Ac toxin), Bollgard® II (cotton cultivars producing Cry1Ac and Cry2Ab2 toxins); VIPCOT® (cotton cultivars producing a VIP-toxin); NewLeaf® (potato cultivars producing the Cry3A toxin); Bt-Xtra®, NatureGard®, KnockOut®, BiteGard®, Protecta®, Bt11 (e. g., Agrisure® CB) and Bt176 from Syngenta Seeds SAS, France, (corn cultivars producing the Cry1Ab toxin and PAT enzyme), MIR604 from Syngenta Seeds SAS, France (corn cultivars producing a modified version of the Cry3A toxin, c.f. WO 03/018810), MON 863 from Monsanto Europe S.A., Belgium (corn cultivars producing the Cry3Bb1 toxin), IPC 531 from Monsanto Europe S.A., Belgium (cotton cultivars producing a modified version of the Cry1Ac toxin) and 1507 from Pioneer Overseas Corporation, Belgium (corn cultivars producing the Cry1F toxin and PAT enzyme).

Furthermore, plants are also covered that are by the use of recombinant DNA techniques capable to synthesize one or more proteins to increase the resistance or tolerance of those plants to bacterial, viral or fungal pathogens. Examples of such proteins are the so-called "pathogenesis-related proteins" (PR proteins, see, e.g., EP-A 392 225), plant disease resistance genes (e. g., potato culti-vars, which express resistance genes acting against *Phytophthora infestans* derived from the Mexican wild potato, *Solanum bulbocastanum*) or T4-lyso-zym (e.g., potato cultivars capable of synthesizing these proteins with increased resistance against bacteria such as *Erwinia amylovora*). The methods for producing such genetically modified plants are generally known to the person skilled in the art and are described, e.g., in the publications mentioned above.

Furthermore, plants are also covered that are by the use of recombinant DNA techniques capable to synthesize one or more proteins to increase the productivity (e.g., bio-mass production, grain yield, starch content, oil content or protein content), tolerance to drought, salinity or other growth-limiting environmental factors or tolerance to pests and fungal, bacterial or viral pathogens of those plants.

Furthermore, plants are also covered that contain by the use of recombinant DNA techniques a modified amount of ingredients or new ingredients, specifically to improve human or animal nutrition, e. g., oil crops that produce health-promoting long-chain omega-3 fatty acids or unsaturated omega-9 fatty acids (e. g., Nexera® rape, Dow AgroSciences, Canada).

Furthermore, plants are also covered that contain by the use of recombinant DNA techniques a modified amount of ingredients or new ingredients, specifically to improve raw material production, e.g., potatoes that produce increased amounts of amylopectin (e.g. Amflora® potato, BASF SE, Germany).

The following examples serve to illustrate the invention.

EXAMPLES

I. Control of Resistant Weed Biotypes

The herbicidal activity of herbicide A on resistant weed biotypes was tested in comparison with certain commercial herbicides by the following greenhouse experiments:

The culture containers used were plastic flowerpots containing loamy sand with approximately 3.0% of humus as the substrate. The seeds of the test plants were sown separately for each species. Six blackgrass (ALOMY) (10-103, 10-170, 09-591, 10-123, 11-215, 11-146) and six ryegrass (LOLMU) (12-166, 12-143, 12-165, 12-307, 13-304, 13-313) biotypes with varying degrees of resistance towards a range of modes of action according to the HRAC (Herbicide Resistance Action Committee) classification on mode of action 2010 (see e.g http://www.hracglobal.com/pages/classificationofherbicidesiteofaction.aspx) were tested alongside two non-resistant biotypes (14-116 and 13-243), see Tables 1 and 2 below.

For the post-emergence treatment, the test plants were first grown to a height of 3 to 15 cm, depending on the plant habit, and only then treated with the active ingredients which had been suspended or emulsified in water. For this purpose, the test plants were either sown directly and grown in the same containers, or they were first grown separately as seedlings and transplanted into the test containers a few days prior to treatment.

Depending on the species, the plants were kept at 10-25° C. or 20-35° C. The test period extended over 2 to 4 weeks. During this time, the plants were tended, and their response to the individual treatments was evaluated.

The racemic mixture (±)-2-exo-(2-Methylbenzyloxy)-1-methyl-4-isopropyl-7-oxabicyclo[2.2.1]heptane was used as herbicide A and formulated as emulsifiable concentrates with an active ingredient concentration of 50 g/l, 100 g/l or 750 g/l respectively.

Flufenacet was used as a commercial concentrated solution formulation having an active ingredient concentration of 500 g/l (Cadou).

Imazamox was used as a water dispersible granule (70% WG).

Evaluation of the herbicidal activity was carried out using a scale from 0 to 100. 100 means complete destruction of at least the aerial moieties, and 0 means no damage, or normal course of growth. A good herbicidal activity is given at values of at least 70 and a very good herbicidal activity is given at values of at least 85.

TABLE 1

Herbicidal activity of herbicide A and certain commercial herbicides applied post-emergence on blackgrass (ALOMY) biotypes

| | | Blackgrass (ALOMY) Biotypes | | | | | | |
|---|---|---|---|---|---|---|---|---|
| | | BT 14-116 | BT 10-103 | BT 10-170 | BT 09-591 | BT 10-123 | BT 11-215 | BT 11-146 |
| | | | | | Resistant HRAC Group | | | |
| | Rate g ai/ha* | Sensitive standard | A, B, K | A, B, K | A, B, K | A, B, C | A, B, C, E, K | K |
| Flufenacet | 250 | 100 | 90 | 95 | 95 | 95 | 95 | 80 |
| | 125 | 98 | 75 | 90 | 80 | 80 | 75 | 70 |
| Imazamox | 125 | 95 | 70 | 95 | 50 | 70 | 85 | 75 |
| | 62.5 | 95 | 60 | 80 | 20 | 60 | 85 | 75 |
| Herbicide A | 250 | 100 | 95 | 90 | 95 | 90 | 95 | 95 |
| | 125 | 65 | 80 | 85 | 80 | 85 | 80 | 90 |

*g ai/ha = grams of active ingredient per hectare

TABLE 2

Herbicidal activity of herbicide A and certain commercial herbicides applied post-emergence on rygreass (LOLMU) biotypes

| | | Ryegrass (LOLMU) Biotypes | | | | | | |
|---|---|---|---|---|---|---|---|---|
| | | BT 13-243 | BT 12-166 | BT 12-143 | BT 12-165 | BT 12-307 | BT 13-304 | BT 13-313 |
| | | | | | Resistant HRAC Group | | | |
| | Rate g ai/ha* | Sensitive standard | A, B, E, K | A, B, C, E, K | A, B, E, K | B, F, K, O | A, B, E, K | A, B, C, E, K |
| Flufenacet | 250 | 95 | 60 | 60 | 60 | 15 | 75 | 50 |
| | 125 | 80 | 10 | 60 | 60 | 15 | 75 | 35 |
| Imazamox | 125 | 85 | 98 | 75 | 85 | 85 | 85 | 85 |
| | 62.5 | 90 | 85 | 65 | 70 | 80 | 90 | 80 |
| Herbicide A | 250 | 90 | 90 | 95 | 100 | 90 | 95 | 95 |
| | 125 | 75 | 90 | 80 | 95 | 70 | 85 | 70 |

*g ai/ha = grams of active ingredient per hectare

As can be seen from the data in Tables 1 and 2, in a post-emergence treatment when compared against commercial herbicides, herbicide A exerts a very good herbicidal activity against various biotypes of blackgrass (ALOMY) and ryegrass (LOLMU) with varying degrees of resistance towards a range of modes of action according to the HRAC (Herbicide Resistance Action Committee) classification on mode of action 2010.

II. Synergistic Interaction of Herbicides A and B

The effect of the herbicidal compositions according to the invention of herbicides A and B on the growth of undesirable plants compared to the herbicidally active compounds alone is demonstrated by the following greenhouse experiments:

The test plants are seeded, separately for each species, in plastic containers in sandy loamy soil containing 5% of organic matter.

For the pre-emergence treatment, the active compounds, suspended or emulsified in water, are applied directly after sowing by means of finely distributing nozzles. The containers are irrigated gently to promote germination and growth and subsequently covered with transparent plastic hoods until the plants have rooted. This cover causes uniform germination of the test plants unless this is adversely affected by the active compounds.

For the post emergence treatment, the plants are first grown to the 2 leaf station (GS 12). Here, the herbicidal compositions are suspended or emulsified in water as distribution medium and sprayed using finely distributing nozzels.

The plants are cultivated due to their individual requirements at 10-25° C. and 20-35° C. The plants are irrigated due to their necessity.

The racemic mixture (±)-2-exo-(2-M ethylbenzyloxy)-1-methyl-4-isopropyl-7-oxabicyclo[2.2.1]heptane may be used as herbicide A and formulated as emulsifiable concentrates with an active ingredient concentration of e.g. 50 g/l, 100 g/l or 750 g/l.

Herbicide B can be used e.g. as commercial formulation containing the respective active ingredient in appropriate concentrations.

For example, the herbicidal activity for the individual herbicidal compositions (solo and mixture applications) can be assessed at different time invervals after treatment, e.g. 5, 10, 15 or 20 days after treatment (DAT).

The evaluation for the damage on undesired weeds caused by the chemical compositions is carried out using a scale from 0 to 100%, compared to the untreated control plants. Here, 0 means no damage and 100 means complete destruction of the plants.

The plants used in the greenhouse experiments can be selected, inter alia, from the following species:

| EPPO Code | Scientific name |
|---|---|
| ABUTH | Abutilon theophrasti |
| ALOMY | Alopecurus myosuroides |
| AMARE | Amaranthus retroflexus |
| AMBEL | Ambrosia artemisiifolia |
| ANTAR | Anthemis arvensis |
| APESV | Apera spica-ventis |
| AVEFA | Avena fatua |
| BROST | Bromus sterilis |
| BRSNW | Brassica napus |
| CAPBP | Capsella bursa-pastoris |
| CHEAL | Chenopodium album |
| DESSO | Descurainia sophia |
| ECHCG | Echinochloa crus-galli |
| GALAP | Galium aparine |
| GASPA | Galinsoga parviflora |
| GERDI | Geranium dissectum |
| LOLMU | Lolium multiflorum |
| LOLRI | Lolium rigidum |
| MATIN | Matricaria inodora |
| PAPRH | Papaver rhoeas |
| PHAMI | Phalaris minor |
| POLCO | Polygonum convolvulus |
| SETVI | Setaria viridis |
| SOLNI | Solanum nigrum |
| SSYOF | Sisymbrium officinale |
| STEME | Stellaria media |
| THLAR | Thlaspi arvensis |

Colby's equation can be applied to determine whether the combination of herbicide A and herbicide B shows a synergistic effect (see S. R. Colby, "Calculating synergistic and antagonistic responses of herbicide combinations", Weeds 1967, 15, pp. 20-22).

$$E = X + Y - (X \cdot Y/100)$$

where X=effect in percent using herbicide A at an application rate a;

Y=effect in percent using herbicide B at application rate b;

E=expected effect (in %) of herbicide A+herbicide B at application rates a+b.

The value E corresponds to the effect (plant damage or injury) which is to be expected if the activity of the individual compounds is additive. If the observed effect is higher than the value E calculated according to the Colby equation, a synergistic effect is present.

III. Synergistic Interaction of Herbicide A with the Herbicides B.5 (cyhalofop-butyl), B.23 (bispyribac-sodium), B.53 (metsulfuron-methyl) and B.217 (quizalofop-P-ethyl)

The effect of specific herbicidal compositions according to the invention of herbicide A and B on the growth of undesirable plants compared to the herbicidally active compounds alone was demonstrated by the following greenhouse experiment.

The test plants have been seeded, separately for each species, in plastic containers in sandy loamy soil containing 5% of organic matter.

For the post-emergence treatment, the plants were first grown to the 2 leaf station (GS 12) and applied at GS 12-19 depending on the species. The herbicidal compositions were suspended or emulsified in water as distribution medium and sprayed using finely distributing nozzles.

The plants have been cultivated due to their individual requirements at 10-25° C. and 20-35° C. The plants were irrigated due to their necessity.

The racemic mixture (±)-2-exo-(2-Methylbenzyloxy)-1-methyl-4-isopropyl-7-oxabicyclo[2.2.1]heptane was used as herbicide A and formulated as emulsifiable concentrate having an active ingredient concentration of 750 g/l.

Cyhalofop-butyl (herbicide B.5) was used as an emulsifiable concentrate (EC) formulation having an active ingredient concentration of 200 g/l.

Metsulfuron-methyl (herbicide B.53) was used as a water soluble granule (SG) formulation having an active ingredient concentration of 20%.

Bispyribac-sodium (herbicide B.23) was used as a soluble concentrate (SL) formulation having an active ingredient concentration of 408 g/l.

Quizalofop-P-ethyl (herbicide B.217) was used as a suspension concentrate (SC) formulation having an active ingredient concentration of 106 g/l.

In the following experiments, the herbicidal activity for the individual herbicide compounds (solo and mixture applications) was assessed 20 days after treatment (DAT).

The evaluation for the damage on undesired weeds caused by the chemical compositions was carried out using a scale from 0 to 100%, compared to the untreated control plants. Here, 0 means no damage and 100 means complete destruction of the plants.

The plants used in the greenhouse experiments belonged to the following species:

| EPPO Code | Scientific name |
|---|---|
| ALOMY | *Alopecurus myosuroides* |
| BROST | *Bromus sterilis* |
| BRSNW | *Brassica napus* |
| GALAP | *Galium aparine* |
| LOLRI | *Lolium rigidum* |
| MATIN | *Matricaria inodora* |
| PAPRH | *Papaver rhoeas* |

Colby's equation was applied to determine whether the combination of herbicide A and herbicide B shows a synergistic effect (see S. R. Colby, "Calculating synergistic and antagonistic responses of herbicide combinations", Weeds 1967, 15, pp. 20-22).

$$E = X + Y - (X \cdot Y/100)$$

where X=effect in percent using herbicide A at an application rate a;

Y=effect in percent using herbicide B at application rate b;

E=expected effect (in %) of herbicide A+herbicide B at application rates a+b.

The value E corresponds to the effect (plant damage or injury) which is to be expected if the activity of the individual compounds is additive. If the observed effect is higher than the value E calculated according to the Colby equation, a synergistic effect is present.

Tables 3 to 6 below relate the herbicidal activity, in greenhouse trials, of the individual actives and the combination applied at different rates and ratios, in post-emergence application at 20 days after treatment (DAT).

TABLE 3

Postemergence application of herbicide A + herbicide B.5 (cyhalofop-butyl)

| | solo application | | | | combination | | |
|---|---|---|---|---|---|---|---|
| | herbicide A | | cyhalofop-butyl | | herbicide A + cyhalofop-butyl | | |
| Weed species | use rate (g ai/ha) | herbicidal activity (%) | use rate (g ai/ha) | herbicidal activity (%) | use rate (g ai/ha) | herbicidal activity (%) | Colby expected herbicidal activity E (%) |
| BRSNW | 500 | 0 | 100 | 0 | 500 + 100 | 30 | 0 |
| ALOMY | 250 | 70 | 50 | 20 | 250 + 50 | 85 | 76 |
| ALOMY | 125 | 55 | 25 | 5 | 125 + 25 | 80 | 57 |
| LOLRI | 62.5 | 15 | 12.5 | 25 | 62.5 + 12.5 | 40 | 36 |
| BROST | 500 | 25 | 100 | 0 | 500 + 100 | 30 | 25 |
| MATIN | 500 | 25 | 100 | 0 | 500 + 100 | 35 | 25 |
| GALAP | 500 | 45 | 100 | 0 | 500 + 100 | 65 | 45 |
| GALAP | 250 | 35 | 50 | 0 | 250 + 50 | 60 | 35 |
| PAPRH | 250 | 40 | 50 | 0 | 250 + 50 | 60 | 40 |
| PAPRH | 62.5 | 0 | 12.5 | 0 | 62.5 + 12.5 | 15 | 0 |

TABLE 4

Postemergence application of herbicide A + herbicide B.23 (Bispyribac-sodium)

| | solo application | | | | combination | | |
|---|---|---|---|---|---|---|---|
| | herbicide A | | bispyribac-sodium | | herbicide A + bispyribac-sodium | | |
| Weed species | use rate (g ai/ha) | herbicidal activity (%) | use rate (g ai/ha) | herbicidal activity (%) | use rate (g ai/ha) | herbicidal activity (%) | Colby expected herbicidal activity E (%) |
| BRSNW | 62.5 | 0 | 15 | 98 | 62.5 + 15 | 100 | 98 |
| ALOMY | 250 | 70 | 60 | 0 | 250 + 60 | 75 | 70 |
| ALOMY | 125 | 55 | 30 | 0 | 125 + 30 | 65 | 55 |
| LOLRI | 250 | 50 | 60 | 5 | 250 + 60 | 60 | 53 |
| MATIN | 500 | 25 | 120 | 90 | 500 + 120 | 95 | 93 |
| MATIN | 250 | 0 | 60 | 85 | 250 + 60 | 90 | 85 |
| GALAP | 500 | 45 | 120 | 95 | 500 + 120 | 100 | 97 |
| GALAP | 125 | 35 | 30 | 65 | 125 + 30 | 100 | 77 |
| GALAP | 62.5 | 25 | 15 | 40 | 62.5 + 15 | 75 | 55 |
| PAPRH | 500 | 60 | 120 | 50 | 500 + 120 | 90 | 80 |
| PAPRH | 250 | 40 | 60 | 50 | 250 + 60 | 80 | 70 |
| PAPRH | 62.5 | 0 | 15 | 0 | 62.5 + 15 | 55 | 0 |

TABLE 5

Postemergence application of herbicide A + herbicide B.53 (Metsulfuron-methyl)

| | solo application | | | | combination | | |
|---|---|---|---|---|---|---|---|
| | herbicide A | | metsulfuron-methyl | | herbicide A + metsulfuron-methyl | | |
| Weed species | use rate (g ai/ha) | herbicidal activity (%) | use rate (g ai/ha) | herbicidal activity (%) | use rate (g ai/ha) | herbicidal activity (%) | Colby expected herbicidal activity E (%) |
| BRSNW | 500 | 0 | 8 | 98 | 500 + 8 | 100 | 98 |
| BRSNW | 125 | 0 | 2 | 95 | 125 + 2 | 98 | 95 |
| BRSNW | 62.5 | 0 | 1 | 90 | 62.5 + 1 | 98 | 90 |
| ALOMY | 62.5 | 30 | 1 | 0 | 62.5 + 1 | 40 | 30 |
| LOLRI | 62.5 | 15 | 1 | 10 | 62.5 + 1 | 30 | 24 |
| MATIN | 500 | 25 | 8 | 90 | 500 + 8 | 98 | 93 |
| MATIN | 250 | 0 | 4 | 85 | 250 + 4 | 100 | 85 |
| MATIN | 125 | 0 | 2 | 90 | 125 + 2 | 98 | 90 |
| MATIN | 62.5 | 0 | 1 | 90 | 62.5 + 1 | 95 | 90 |
| GALAP | 500 | 45 | 8 | 25 | 500 + 8 | 60 | 59 |
| GALAP | 250 | 35 | 4 | 30 | 250 + 4 | 60 | 55 |
| PAPRH | 500 | 60 | 8 | 98 | 500 + 8 | 100 | 99 |
| PAPRH | 250 | 40 | 4 | 50 | 250 + 4 | 100 | 70 |
| PAPRH | 62.5 | 0 | 1 | 0 | 62.5 + 1 | 95 | 0 |

TABLE 6

Postemergence application of herbicide A + herbicide B. 217 (Quizalofop-P-ethyl)

| | solo application | | | | combination | | |
|---|---|---|---|---|---|---|---|
| | herbicide A | | quizalofop-P-ethyl | | herbicide A + quizalofop-P-ethyl | | |
| Weed species | use rate (g ai/ha) | herbicidal activity (%) | use rate (g ai/ha) | herbicidal activity (%) | use rate (g ai/ha) | herbicidal activity (%) | Colby expected herbicidal activity E (%) |
| BRSNW | 500 | 0 | 120 | 0 | 500 + 120 | 25 | 0 |
| ALOMY | 500 | 80 | 120 | 85 | 500 + 120 | 98 | 97 |
| ALOMY | 125 | 55 | 30 | 65 | 125 + 30 | 98 | 84 |
| ALOMY | 62.5 | 30 | 15 | 60 | 62.5 + 15 | 90 | 72 |
| LOLRI | 125 | 30 | 30 | 95 | 150 + 30 | 100 | 97 |
| LOLRI | 62.5 | 15 | 15 | 80 | 62.5 + 15 | 98 | 83 |
| BROST | 500 | 25 | 120 | 95 | 500 + 120 | 100 | 96 |
| BROST | 250 | 15 | 60 | 80 | 250 + 60 | 98 | 83 |
| BROST | 125 | 0 | 30 | 50 | 125 + 30 | 90 | 50 |
| BROST | 62.5 | 0 | 15 | 15 | 62.5 + 15 | 30 | 15 |
| MATIN | 250 | 0 | 60 | 10 | 250 + 60 | 30 | 10 |

TABLE 6-continued

Postemergence application of herbicide A + herbicide B. 217 (Quizalofop-P-ethyl)

| | solo application | | | | combination | | |
|---|---|---|---|---|---|---|---|
| | herbicide A | | quizalofop-P-ethyl | | herbicide A + quizalofop-P-ethyl | | |
| Weed species | use rate (g ai/ha) | herbicidal activity (%) | use rate (g ai/ha) | herbicidal activity (%) | use rate (g ai/ha) | herbicidal activity (%) | Colby expected herbicidal activity E (%) |
| MATIN | 125 | 0 | 30 | 0 | 125 + 30 | 25 | 0 |
| MATIN | 62.5 | 0 | 15 | 0 | 62.5 + 15 | 25 | 0 |
| GALAP | 125 | 35 | 30 | 0 | 125 + 30 | 40 | 35 |
| GALAP | 62.5 | 25 | 15 | 0 | 62.5 + 15 | 35 | 25 |
| PAPRH | 62.5 | 0 | 15 | 25 | 62.5 + 15 | 30 | 25 |

As can be seen from the data in Tables 3 to 6, the combination of herbicide A and herbicide B exhibits an unexpected synergistic effect in that the herbicidal activity against various weed species in a post-emergence treatment is significantly higher than would be predicted based on the values for each of the compounds individually.

The invention claimed is:

1. A method for controlling undesirable vegetation which comprises applying to the vegetation or the locus thereof a herbicidally effective amount of (±)-2-exo-(2-methylbenzyloxy)-1-methyl-4-isopropyl-7-oxabicyclo [2.2.1]heptane, any of its individual enantiomers or any non-racemic mixture thereof (herbicide A) wherein:
the undesirable vegetation comprises at least one herbicide resistant or tolerant weed species which is selected from (A) *Poa annua* and (B) *Digitaria insularis;*
the herbicide resistant or tolerant weed species is a biotype with resistance or tolerance to at least one herbicide selected from the group consisting of acetyl COA carboxylase (ACCase) inhibitors, acetolactate synthase (ALS) inhibitors, and photosystem II (PS II) inhibitors;
the herbicide A is the only herbicidally active ingredient;
the herbicide A is applied in an amount of (A) 50 to 500 g/ha when the herbicide resistant or tolerant weed species is *Poa annua* or (B) 10 to 250 g/ha when the herbicide resistant or tolerant weed species is *Digitaria insularis,*
the herbicide A is applied before emergence of the undesirable vegetation,
the herbicide A has a herbicidal activity of at least 85 against the at least one herbicide resistant or tolerant weed species,
the herbicide A has a herbicidal activity of at least 85 against a sensitive standard of the at least one weed species when applied in the same amount as against the at least one herbicide resistant of tolerant weed species, and
the herbicidal activity is expressed as a percentage of weed aerial moieties destroyed by application of the herbicide A.

2. The method of claim 1, wherein the herbicide A is (±)-2-exo-(2-methylbenzyloxy)-1-methyl-4-isopropyl-7-oxabicyclo [2.2.1]heptane.

3. The method of claim 1, wherein the undesirable vegetation is controlled in crop plants selected from wheat, barley, rye, *triticale*, oat, corn (maize), sunflower, rice, soybeans, peas, *Vicia*-beans, *Phaseolus*-beans, peanuts, oilseed rape, canola, cotton, potato, sugarbeet, sugarcane, turfgrasses and vegetables.

4. The method of claim 1, further comprising applying at least one safener C selected from the group consisting of benoxacor, cloquintocet, cyometrinil, cyprosulfamide, dichlormid, dicyclonon, dietholate, fenchlorazole, fenclorim, flurazole, fluxofenim, furilazole, isoxadifen, mefenpyr, mephenate, naphthaleneacetic acid (NAA), naphthalic anhydride (NA), oxabetrinil, 4 (dichloroacetyl)-1-oxa-4-azaspiro [4.5]decane (MON4660), 2,2,5-trimethyl-3-(dichloroacetyl)-1,3-oxazolidine (R 29148), N-(2-Methoxybenzoyl)-4-[(methylaminocarbonyl) amino]benzenesulfonamide and agriculturally acceptable salts, esters or amides thereof.

5. The method of claim 1, further comprising applying one or more auxiliaries customary in crop protection.

6. The method of claim 1, wherein a composition comprising a herbicidally effective amount of herbicide A is applied.

7. The method of claim 1, wherein the at least one herbicide resistant or tolerant weed species is *Poa annua*.

8. The method of claim 1, wherein the at least one herbicide resistant or tolerant weed species is *Digitaria insularis*.

9. The method of claim 1, wherein, relative to the sensitive standard, the resistant or tolerant weed species exhibits one or more of (i) a gene mutation coding for or overproducing an herbicide target-site enzyme limiting binding of the at least one herbicide, (ii) reduced uptake or translocation of the at least one herbicide, (iii) increased sequestration of the at least one herbicide, and (iv) enhanced metabolism of the at least one herbicide.

10. The method of claim 7, wherein, relative to the sensitive standard, the resistant or tolerant weed species exhibits one or more of (i) a gene mutation coding for or overproducing an herbicide target-site enzyme limiting binding of the at least one herbicide, (ii) reduced uptake or translocation of the at least one herbicide, (iii) increased sequestration of the at least one herbicide, and (iv) enhanced metabolism of the at least one herbicide.

11. The method of claim 8, wherein, relative to the sensitive standard, the resistant or tolerant weed species exhibits one or more of (i) a gene mutation coding for or overproducing an herbicide target-site enzyme limiting binding of the at least one herbicide, (ii) reduced uptake or translocation of the at least one herbicide, (iii) increased sequestration of the at least one herbicide, and (iv) enhanced metabolism of the at least one herbicide.

* * * * *